US009819485B2

(12) United States Patent
Chastain et al.

(10) Patent No.: US 9,819,485 B2
(45) Date of Patent: Nov. 14, 2017

(54) APPARATUS AND METHOD FOR SECURE DELIVERY OF DATA UTILIZING ENCRYPTION KEY MANAGEMENT

(71) Applicant: AT&T Intellectual Property I, LP, Atlanta, GA (US)

(72) Inventors: Walter Cooper Chastain, Atlanta, GA (US); Stephen Emille Chin, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 60 days.

(21) Appl. No.: 14/267,019

(22) Filed: May 1, 2014

(65) Prior Publication Data

US 2015/0319151 A1 Nov. 5, 2015

(51) Int. Cl.

| | |
|---|---|
| ***H04L 29/06*** | (2006.01) |
| ***H04L 9/08*** | (2006.01) |
| ***G06F 21/60*** | (2013.01) |
| ***H04W 12/04*** | (2009.01) |

(52) U.S. Cl.

CPC ............ *H04L 9/083* (2013.01); *G06F 21/602* (2013.01); *G06F 21/604* (2013.01); *H04L 9/0825* (2013.01); *H04L 63/045* (2013.01); *H04L 63/061* (2013.01); *H04L 63/062* (2013.01); *H04L 63/068* (2013.01); *H04W 12/04* (2013.01); *H04L 2463/061* (2013.01)

(58) Field of Classification Search

CPC ......... H04L 2463/041; H04L 2463/061; H04L 2463/062

USPC ........................................ 713/150, 168, 171

See application file for complete search history.

(56) References Cited

U.S. PATENT DOCUMENTS

| | | | | |
|---|---|---|---|---|
| 6,850,252 | B1 * | 2/2005 | Hoffberg | 715/716 |
| 7,346,586 | B1 * | 3/2008 | Walmsley | G06F 21/445 380/259 |
| 7,882,208 | B2 * | 2/2011 | Akashika | G06Q 20/32 235/380 |

(Continued)

FOREIGN PATENT DOCUMENTS

| | | | |
|---|---|---|---|
| EP | 2074741 | A1 | 7/2009 |
| EP | 2210436 | A1 | 7/2010 |
| WO | 2009/126647 | | 10/2009 |

OTHER PUBLICATIONS

Secure transmission of the prescription order communication system based on the internet and the public-key infrastructure using master smart cards in the 2-way type terminal, IEEE 2002, Song et al, 10.1109/HICSS.2002.994128.*

(Continued)

*Primary Examiner* — Jahangir Kabir

(74) *Attorney, Agent, or Firm* — Guntin & Gust, PLC; Atanu Das

(57) ABSTRACT

A device that incorporates the subject disclosure may perform, for example, receiving a derived encryption key from a remote management server without receiving a master key from which the derived encryption key was generated, applying a one-way function to the derived encryption key and a nonce to generate a temporary encryption key, obtaining data for transmission to a recipient device, encrypting the data using the temporary encryption key to generate encrypted data, and providing the encrypted data over a network to the recipient device. Other embodiments are disclosed.

17 Claims, 18 Drawing Sheets

120
Remote Management Server
Network 122
150
Application server/Recipient device
Device Processor
104
Secure Device Processor
106
UICC
108
Secure Services Platform
102
110

(56) References Cited

U.S. PATENT DOCUMENTS

| | | | | |
|---|---|---|---|---|
| 7,933,591 | B2 | 4/2011 | Blom et al. | |
| 7,953,391 | B2 | 5/2011 | Lee et al. | |
| 8,037,522 | B2 | 10/2011 | Holtmanns et al. | |
| 8,260,259 | B2 | 9/2012 | Semple et al. | |
| 8,307,410 | B2 | 11/2012 | Martin et al. | |
| 8,335,921 | B2 | 12/2012 | von Behren et al. | |
| 8,346,287 | B2 | 1/2013 | King et al. | |
| 8,391,837 | B2 | 3/2013 | Corda | |
| 8,452,012 | B2 | 5/2013 | Aissi et al. | |
| 8,495,213 | B2 | 7/2013 | Deprun et al. | |
| 8,503,376 | B2 | 8/2013 | Cha et al. | |
| 8,510,559 | B2 | 8/2013 | Guccione et al. | |
| 8,543,814 | B2 | 9/2013 | Laitinen et al. | |
| 8,625,800 | B2 | 1/2014 | Jooste et al. | |
| 9,106,628 | B2 * | 8/2015 | Kolesnikov | H04L 63/061 |
| 9,521,126 | B2 * | 12/2016 | Yarvis | H04L 63/061 |
| 2005/0120248 | A1 * | 6/2005 | Medvinsky | H04L 9/3263<br>726/4 |
| 2006/0085848 | A1 | 4/2006 | Aissi et al. | |
| 2006/0101270 | A1 | 5/2006 | Laitinen | |
| 2006/0206710 | A1 | 9/2006 | Gehrmann | |
| 2007/0101122 | A1 | 5/2007 | Guo | |
| 2007/0299780 | A1 | 12/2007 | Vanska et al. | |
| 2008/0294891 | A1 * | 11/2008 | Ram OV | H04W 12/06<br>713/158 |
| 2008/0301433 | A1 | 12/2008 | Vito | |
| 2010/0062808 | A1 | 3/2010 | Cha et al. | |
| 2010/0287375 | A1 * | 11/2010 | Lee | G06Q 20/04<br>713/171 |
| 2012/0047237 | A1 | 2/2012 | Arvidsson et al. | |
| 2013/0117824 | A1 | 5/2013 | Naslund et al. | |
| 2013/0139230 | A1 | 5/2013 | Koh et al. | |
| 2013/0212660 | A1 | 8/2013 | Neafsey et al. | |
| 2013/0223623 | A1 * | 8/2013 | Jooste et al. | 380/44 |
| 2014/0040633 | A1 | 2/2014 | Leleu | |
| 2014/0045462 | A1 * | 2/2014 | Warnez | 455/411 |
| 2014/0101449 | A1 * | 4/2014 | Trujillo Gonzalez | H04W 8/183<br>713/171 |
| 2014/0380056 | A1 * | 12/2014 | Buckley | H04L 9/0847<br>713/171 |

OTHER PUBLICATIONS

IC activation and user authentication for security-sensitive systems, IEEE 2008, Huang et al, 10.1109/HST.2008.4559056.*

"Mobile/NFC Security Fundamentals Secure Elements 101" Smart Card Alliance Webinar Mar. 28, 2013.

Ericsson, "The OTA Platform in the World of LTE". Giesecke & Devrient, Jan. 2011.

Lunde, Lars et al., "Using SIM for strong end-to-end Application Authentication," NTNU Innovation and Creativity, Master of Science in Communication Technology, 170 pgs., May 2006.

Nakarmi, Prajwol K., "Evaluation of VoIP Security for Mobile Devices," KTH Royal Institute of Technology, Master's Thesis, Stockholm, 82 pgs. Jun. 16, 2011.

Nelenkov, "Using the SIM card as a secure element in Android", http''//nelenkov.blogspot.com/2013/09/using-sim-card-as-secure-element.ntml, 11 pgs., 2013.

Sher, "Secure service provisioning (SSP) framework for IP multimedia subsystem (IMS)", Technical University of Berlin Doctoral thesis, 225 pgs., Dec. 14, 2007.

Siddiqi, "Smart Card Packaging Process Control System," KTH Royal Insitute of Technology School of Information and Communication Technology Stockholm, Sweden Masters Thesis, 102 pgs., Aug. 1, 2012.

* cited by examiner

100

200

300

400

500

600

700

Decryption Function

Synchronization Detector

800

900

1100

1200

1300

1400

1500

1600

SHO
1611
SHS
1610
1630
1662
VHO 1
VHO 2
VHO 3
VHO 4
VHO 5
VHO 6
ISP
Network
1632
1612
1614
VHS
1618
ACCESS NETWORK
1617
1629
1615
1619
Satellite dish
receiver
1631
1608
1666
STB
1606
G 1604
Ctrl 1607
ISP Ntwk 1632
1616
Cable TV
1633
1666
1602
1608
Remote
Services

APPARATUS AND METHOD FOR SECURE DELIVERY OF DATA UTILIZING ENCRYPTION KEY MANAGEMENT

FIELD OF THE DISCLOSURE

The subject disclosure relates to an apparatus and method for secure delivery of data utilizing encryption key management.

BACKGROUND

Electronic devices are being utilized with more frequency to store data and distribute the data to other devices. The data can often be private or confidential, and users desire to have confidence that any data that they are providing to another device is being done securely to avoid unauthorized users from accessing the data.

BRIEF DESCRIPTION OF THE DRAWINGS

Reference will now be made to the accompanying drawings, which are not necessarily drawn to scale, and wherein.

DETAILED DESCRIPTION

Figure 1:
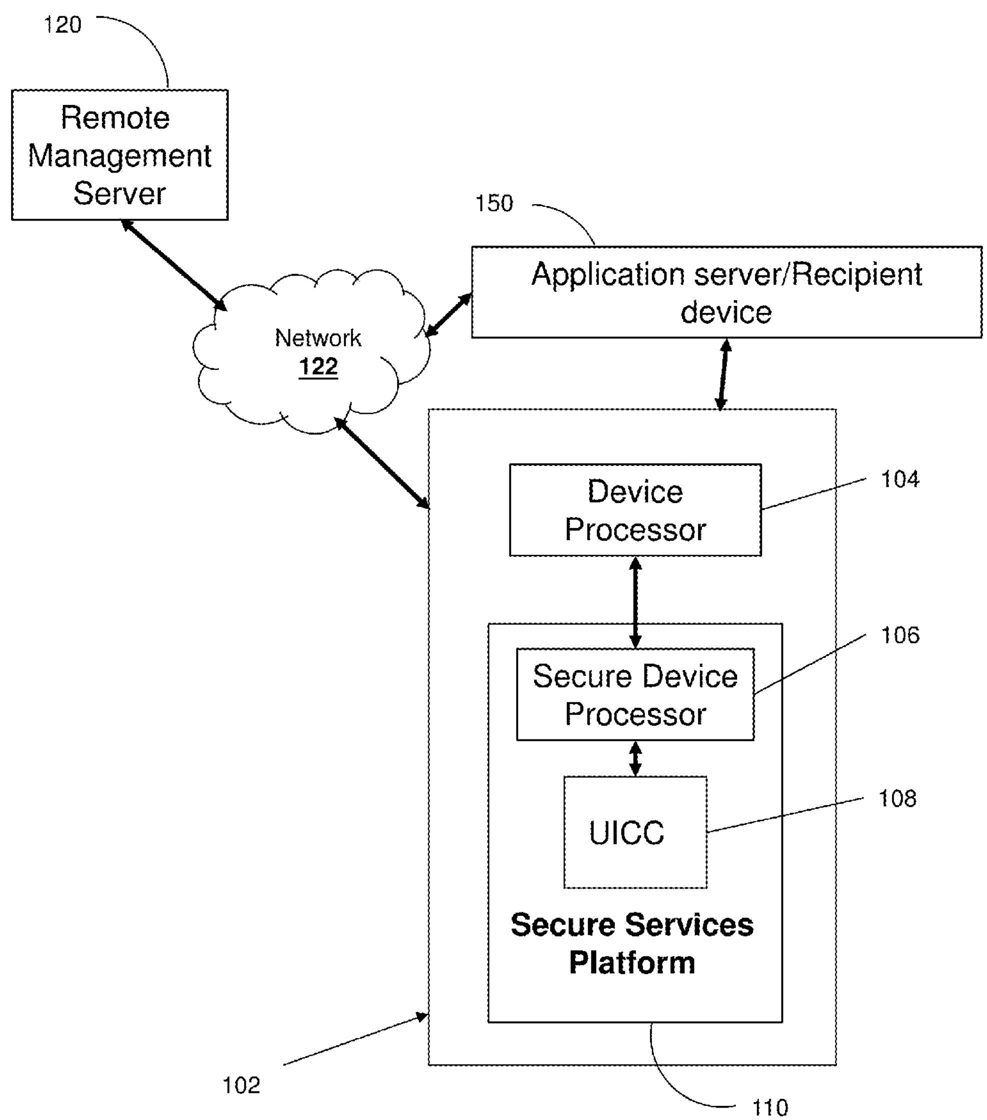
FIG. 1 depicts an illustrative embodiment of a system that enables use of a UICC and a secure device processor as part of a secure services platform for a secure transfer of data with a communication device.

The subject disclosure describes, among other things, illustrative embodiments in which data can be transferred between devices using a key management procedure. In one embodiment, a secure element and a secure device processor of a mobile communication device can be utilized together to enable a secure upload or delivery of data from the mobile communication device to another device, such as an application (function) server, another end user device, a removable memory device, and so forth.

In one or more embodiments, data (e.g., media content, user information, and so forth) is encrypted using temporary symmetric keys that are generated dynamically from a key hierarchy. Information can be transmitted from the encrypting entity to the decrypting entity that results in the decrypting entity being able to generate the decryption key. Various mechanisms of key exchange can be utilized, such as synchronization and encrypted key exchange. For example, the difference in mechanisms can involve the type and amount of information transmitted and the complexity of the mechanisms. In one or more embodiments, keys may be rotated during a session using mechanisms that are synchronized between devices.

In one or more embodiments, the keys used for user data encryption (e.g., temporary encryption keys) can exhibit very low auto-correlation. Derived and/or temporary keys can be created using one-way functions that are difficult to reverse. In one or more embodiments, the one-way function can be various mathematical operations such as involving prime numbers; cryptographically secure hash functions such as SHA-256' and/or elliptic curves. As an example, the one-way functions can include multiplication and factoring using prime numbers, the Rabin function (modular squaring) (using prime numbers), discrete exponential and logarithm (using a prime number and an integer) functions, and so forth. The one-way functions can utilize a combination of the derived key (or the temporary key) with derivation data (e.g., data associated with an end user device including device identification information, subscriber identification information, and so forth) for key generation. In one or more embodiments, input data (e.g., a nonce) used to generate the temporary encryption keys may not repeat. Master keys can be securely stored and may not be transmitted from a remote management server. Keys derived from the master key (e.g., derived encryption keys) can be securely stored and may not be transmitted from the Universal Integrated Circuit Card (UICC) or application server. In one embodiment, the same mechanisms can be used to upload data from the UICC/SDP and to download data to it.

One or more of the exemplary embodiments can utilize techniques and/or components, in whole or in part, described in U.S. application Ser. No. 14/091,679 filed on Nov. 27, 2013, the disclosure of which is hereby incorporated by reference in its entirety.

In one or more embodiments, the secure element (e.g., executing a temporary encryption key generator, a nonce generator, a number generator, an asymmetrical encryptor, and/or a synchronization function), the secure device processor (e.g., executing a symmetrical encryptor, a synchronization detector, and/or a number generator) and/or a device processor can be separate but in communication with each other. The secure element (e.g., a Universal Integrated Circuit Card (UICC)) can be a highly secure computing platform for storing secrets such as encryption keys and authentication credentials, and can host and execute applets. The secure device processor can be a processor that is logically and/or physically separate from the device processor (and/or the secure element), and can offer more security than the device processor, but not as much security as the secure element. Examples of a secure device processor can include a Trusted Execution Environment (TEE) and an embedded Secure Element (eSE). Other embodiments are included in the subject disclosure.

One embodiment of the subject disclosure is a method that includes obtaining, by a remote management server, a master key, and obtaining, by the remote management server, derivation data associated with an end user device. The method can include applying, by the remote management server, a one-way function to the master key and the derivation data to generate a derived encryption key. The method can include providing, by the remote management server over a network, the derived encryption key to a universal integrated circuit card of the end user device to enable the universal integrated circuit card to generate a temporary encryption key for encrypting data, where the master key is not provided by the remote management server to the end user device One embodiment of the subject disclosure is a communication device that includes a secure element having a secure element memory that stores first executable instructions that, when executed by the secure element, facilitate performance of first operations. The first operations include receiving a derived encryption key from a remote management server without receiving a master key from which the derived encryption key was generated, and applying a one-way function to the derived encryption key and a nonce to generate a temporary encryption key. The communication device can include a secure device processor having a secure device processor memory that stores second executable instructions that, when executed by the secure device processor, facilitate performance of second operations. The second operations can include receiving the temporary encryption key from the secure element without receiving the derived encryption key, obtaining data for transmission to a recipient device, encrypting the data using the temporary encryption key to generate encrypted data, and providing the encrypted data over a network to the recipient device, where the secure device processor is separate from the secure element and in communication with the secure element.

One embodiment of the subject disclosure is a method that includes receiving, by a communication device comprising a processor, a derived encryption key from a remote management server without receiving a master key from which the derived encryption key was generated. The method can include applying, by the communication device, a one-way function to the derived encryption key and a nonce to generate a temporary encryption key. The method can include obtaining, by the communication device, data for transmission to a recipient device. The method can include encrypting, by the communication device, the data using the temporary encryption key to generate encrypted data, and providing, by the communication device, the encrypted data over a network to the recipient device.

In accordance with an embodiment of the disclosure, FIG. 1 depicts a system 100 that includes a communication device 102 connected to or otherwise in communication with a network 122 and provided with a secure services platform 110 enabling secure delivery of data from the communication device 102 to a recipient device (e.g., an application server or recipient device 150).

Device 102 can be loaded with a temporary encryption key generator, a nonce generator, a number generator, an asymmetrical encryptor, and/or a synchronization function (e.g., loaded into a secure element 108) to enable or otherwise facilitate secure delivery of data via key management from the communication device 102 to the recipient device, such as an application server, another end user device, a removable memory device, and so forth. The device 102 can be loaded with a symmetrical encryptor, a synchronization detector, and/or a number generator (e.g., loaded into a secure device processor (SDP) 106) to enable or otherwise facilitate the secure delivery of the data via the key management.

It will be appreciated that the communication device 102 may be any device, including a user device. Device 102 is described as including a secure element and a secure device processor, but other embodiments can combine these components into a single processing unit. The term "user," in this example, refers to a human user of the communication device. However, in other embodiments, the user can be a machine that exchanges data with the communication device 102 after being authenticated to the communication device. Communication device 102 can include a device processor 104, the SDP 106 and the secure element 108 (e.g., which can include a UICC). The secure element 108 can be various types of smart cards including a Subscriber Identification Module (SIM) card or other types of secure element. The secure element 108 can be a secure computing platform and can offer a high level of security for storing encryption keys, authentication credentials, and the like. The secure element 108 may be removable from the device. In other embodiments, the secure element 108 may be embedded in the device and not removable. In other embodiments, the secure element 108 can be placed on a memory card or an embedded chip.

In one or more embodiments, the SDP 106 can be logically and/or physically separate from the device processor 104, and can be connected to both the device processor and the secure element 108. In this embodiment, the SDP 106 can offer a higher level of security than the device processor 104, and can store and execute secure applications. The SDP 106 can, for example, run applications in a trusted execution environment. The secure element 108 and SDP 106 together can form a secure services platform 110 resident on the device 102. In this embodiment, the secure element 108, the SDP 106 and the device processor 104 can each have a security level associated therewith, and the security level associated with the SDP 106 can be intermediate between that of the secure element 108 and that of the device processor 104. The SDP 106 and secure element 108 can use mutual authentication, as described in more detail below.

The secure element 108 and the SDP 106 can communicate with a remote management (function) server 120, located remotely from device 102. The Remote Management Server (RMS) 120 can be a platform for provisioning and/or managing applications in the secure element 108 and the SDP 106. The RMS 120 can also manage data (such as keys, credentials, and so forth) that are used by the applications. Examples of remote management servers are described in U.S. patent application Ser. No. 13/679,479 filed on Nov. 16, 2012 and U.S. patent application Ser. No. 13/680,680 filed on Nov. 19, 2012, the disclosures of both of which are hereby incorporated by reference.

In this embodiment, communication device 102 can be a wireless communication device connected to a cellular network 122. Network 122 can also be other types of networks operating according to various communication protocols, such as a WiFi network. In other embodiments, device 102 can be connected to other devices via a wired connection through a computer. In still other embodiments, user devices can communicate with each other using Bluetooth®, infrared communications (IRDa) and/or near field communications (NFC). A communication session between user devices, wherein information is transferred between the users, can be effected by a wide variety of arrangements. A secure application server (SAS) can be used in some embodiments to establish a secure communication session between devices. However, in some embodiments a secure application server may not be used where the communication session is established in a peer-to-peer manner, such as in Bluetooth®, IRDa or NFC.

System 100 enables components of the secure services platform 110 to perform operations including one or more of receiving a derived encryption key from a remote management server without receiving a master key from which the derived encryption key was generated, applying a one-way function to the derived encryption key and a nonce to generate a temporary encryption key, obtaining data for transmission to a recipient device, encrypting the data using the temporary encryption key to generate encrypted data, and/or providing the encrypted data over a network to the recipient device. These functions can be performed with the SDP 106 being separate from the secure element and in communication with the secure element. In one or more embodiments, the secure element 108 can generate a number and can generate a nonce from the number. The nonce can be a non-repeating data set that includes a time stamp. In another embodiment, the nonce can be generated from or in combination with other information, such as information derived from the user and/or the device.

In one or more embodiments, the secure element 108 can receive a public nonce key from the RMS 120 and can encrypt the nonce using the public nonce key to generate an encrypted nonce, while the SDP 106 can receive the encrypted nonce from the secure element and can provide the encrypted nonce over the network to the recipient device 150 to enable the recipient device to decrypt the encrypted nonce using a private nonce key received by the recipient device from the RMS. In one or more embodiments, the secure element 108 can receive a public temporary encryption key from the remote management server and can encrypt the temporary encryption key using the public temporary encryption key to generate an encrypted temporary encryption key, while the SDP 106 can receive the encrypted temporary encryption key from the secure element and can provide the encrypted temporary encryption key over the network to the recipient device to enable the recipient device to decrypt the encrypted temporary encryption key using a private temporary encryption key received by the recipient device from the RMS 120.

In one or more embodiments, the SDP 106 can monitor for a key rotation event and can provide a key rotation request to the secure element 108 responsive to detecting the key rotation event, while the secure element can generate a second temporary encryption key responsive to the request for the key rotation. In one or more embodiments, the temporary encryption key and the second temporary encryption key can be generated by the secure element 108 during a single communication session, where the second temporary encryption key is generated by applying the one-way function to the derived encryption key and a second nonce. In one or more embodiments, the SDP 106 can generate a number, generate a time stamp, provide the number and the time stamp to the secure element 108, while the secure element 108 can generate the nonce from the number and the time stamp. In one or more embodiments, the derived encryption key received from the remote management server is a fixed length static key.

In one or more embodiments, the secure element 108 can receive a private nonce key from the RMS 120, receive an encrypted second nonce from the recipient device, decrypt the nonce using the private nonce key to generate a second nonce, and apply the one-way function to the derived encryption key and the second nonce to generate a second temporary encryption key, while the SDP 106 can receive encrypted second data from the recipient device, receive the second temporary encryption key from the secure element, and decrypt the encrypted second data using the second temporary encryption key.

In one or more embodiments, the recipient device can be a removable memory device having a connection port to enable a physical coupling with the mobile communication device.

Figure 2:
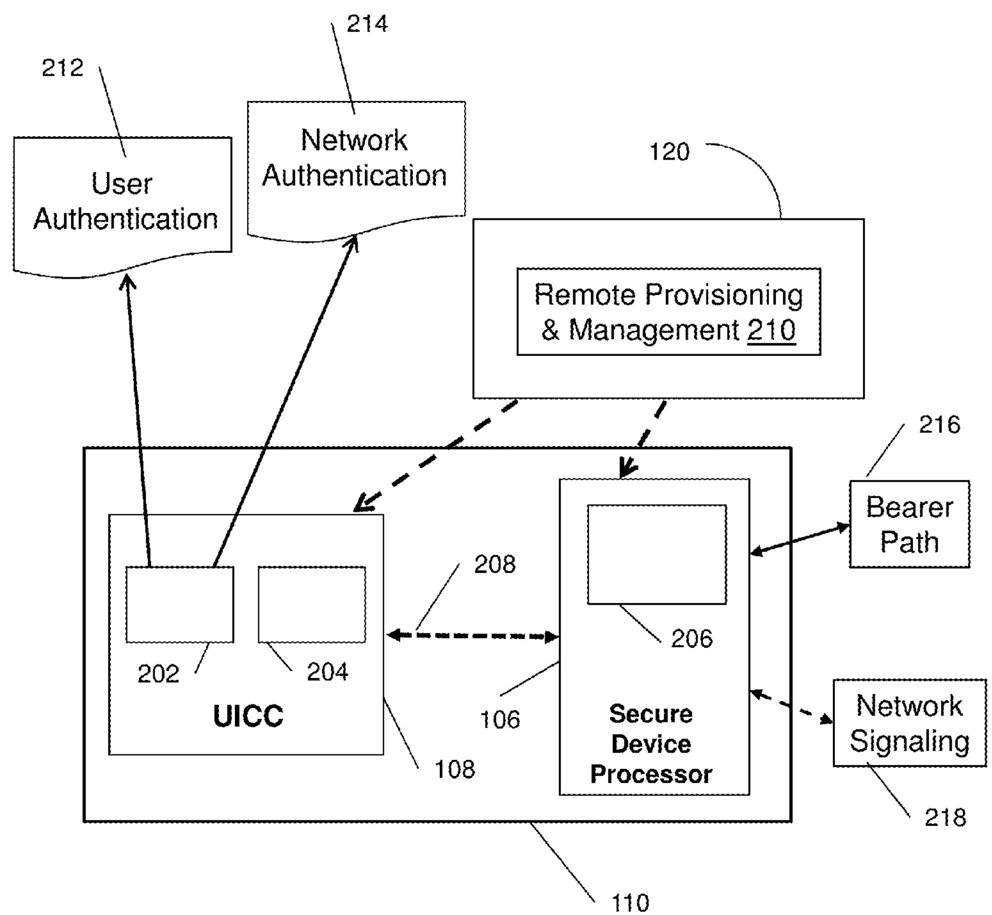
FIG. 2 depicts an illustrative embodiment of a system including the communication device of FIG. 1 implementing authentication and management functions, as well as provisioning functions and encryption functions.

FIG. 2 is a schematic illustration 200 showing details of a secure services platform 110, according to an embodiment of the disclosure, which can be used with the communication device 102 of FIG. 1. The secure element 108 can contain an authentication management function 202 and an encryption key generator 204. The authentication management function 202 can provide authentication services for the device. For example, the authentication management function 202 can support mutual authentication of components of the device 102 or mutual authentication between different devices. As shown in FIG. 2, the authentication management function 202 can include a user authentication service 212 for authenticating the user to the device and a network authentication service 214 for authenticating the device to network equipment. The encryption key generator 204 can supply encryption keys (e.g., a temporary encryption key) to an encryption engine 206 which is located in the SDP 106. In one embodiment, the key generation and/or the encryption can be performed in real-time. In one embodiment, the encryption engine 206 can encrypt and decrypt user information transmitted to or from a bearer path 216 that terminates at another device (e.g., another user device), and/or may encrypt and decrypt information transmitted on a signaling path 218 to the network. In another embodiment, the encryption engine can be loaded on a second secure element, separate from the secure element 108.

In one or more embodiments, the secure services platform 110 can receive a derived encryption key (e.g., from the RMS 120) without receiving a master key from which the derived encryption key was generated, and can apply a one-way function to the derived encryption key and to a nonce to generate a temporary encryption key. The secure services platform 110 can obtain data for transmission to a recipient device (e.g., an application server or another end user device) and can encrypt the data using the temporary encryption key to generate encrypted data. The secure services platform 110 can provide the encrypted data over a network to the recipient device.

The RMS 120 can perform a remote provisioning and management function 210 to load applications, content and/or other information (e.g., various keysets) into the secure element 108 and/or SDP 106. In this embodiment, the RMS 120 can provision the authentication management function 202 and encryption key generator 204 on the secure element 108, and can provision the encryption engine 206 on the SDP 106. This can be done securely by the use of one or more remote management keysets. In one embodiment, before the secure services platform 110 can be used for communication, the SDP 106 can be authenticated by the secure element 108. In one embodiment, this can be done using a UICC-SDP keyset. The UICC-SDP keyset may be provisioned remotely by the RMS 120 or locally by an authorized user. In this embodiment, after the secure element 108 and SDP 106 are mutually authenticated using the UICC-SDP keyset, they can communicate via a signaling path 208 within the secure services platform 110. The UICC-SDP keyset may be used for secure communication during initial loading and provisioning. However, the keys being utilized may be different. In one embodiment, the path between the secure element 108 and the SDP 106 can go through the device processor 104 rather than directly between the secure element and the SDP.

In one or more embodiments, the RMS 120 can obtain a master key and can obtain derivation data associated with a communication device, such as an end user device. For example, the master key can be stored in a memory of the RMS 120 or can be stored in a server that is accessible to the RMS 102. In one or more embodiments, the master key is not stored by the end user device, the UICC, the SDP nor the AS. The RMS 120 can apply a one-way function to the master key and the derivation data to generate a derived encryption key, and can provide over a network the derived encryption key to a UICC of the end user device to enable the UICC to generate a temporary encryption key for encrypting data. The master key may not be provided by the remote management server to the end user device.

In one or more embodiments, the RMS 120 can provide over the network a public nonce key to the UICC to enable the UICC to encrypt a nonce to generate an encrypted nonce. In one embodiment, the RMS 120 can provide over the network a private nonce key to an application server (or other recipient device) to enable the application server to decrypt the encrypted nonce that is received by the application server from the end user device.

In one or more embodiments, the RMS 120 can provide over the network the derived encryption key to the application server (or other recipient device) to enable the application server to decrypt encrypted data using the derived encryption key and the nonce, where the encrypted data is received by the application server from the end user device.

In one or more embodiments, the one-way function can include a hash function. In one or more embodiments, the nonce can include a non-repeating data set that includes a time stamp. In one or more embodiments, the one-way function can include mathematical operations involving prime numbers, cryptographically secure hash functions such as SHA-256, and elliptic curves. In one or more embodiments, a size of nonces generated by the UICC varies over time. In one or more embodiments, the one-way function can include a fractal function. In one or more embodiments, the master key is not provided by the RMS 120 to the application server. For example, the application server and the end user device cannot access or otherwise obtain the master key that is obtained by the RMS 120.

In one or more embodiments, the RMS 120 can provide over the network a public temporary encryption key to the UICC of the end user device to enable the UICC to encrypt a temporary encryption key to generate an encrypted temporary encryption key. In one or more embodiments, the RMS 120 can provide over the network a private temporary encryption key to an application server (or other recipient device) to enable the application server to decrypt the encrypted temporary encryption key that is received by the application server from the end user device.

In one embodiment of FIG. 2, the secure services platform 110 enables the secure delivery of data through encryption and/or modification by the SDP 106 according to a temporary encryption key that is generated from a derived encryption key stored by the secure element 108 and which are inaccessible to the SDP 106. The modification of the data can include the adding of additional information to the data, such as authentication data, permissions, time stamps, user credentials, digital rights management information and so forth. The modification can also include encryption, such that the data is doubly encrypted utilizing separate derived keys.

Figure 3:
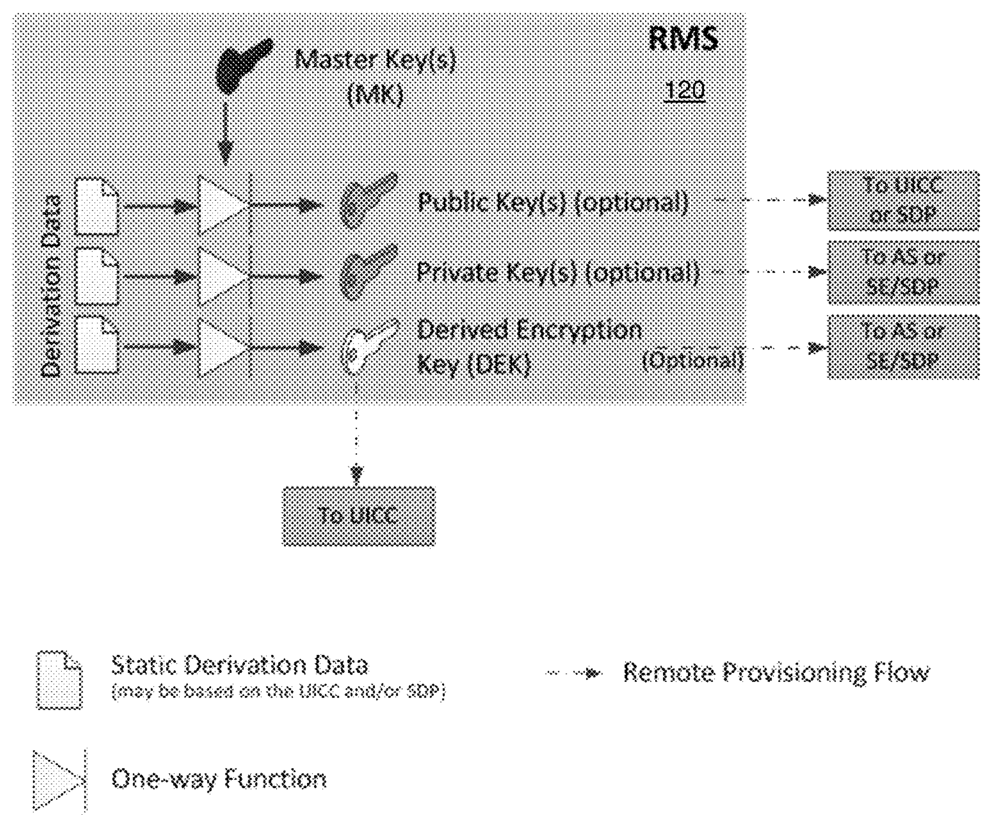
FIG. 3 depicts an illustrative embodiment of a system that utilizes a remote management server for distributing keys used for securely uploading or downloading data from or to a mobile communication device.

Referring to FIG. 3, a system 300 is depicted which illustrates the RMS 120 securely storing a master key and generating keys from the master key, such as a derived encryption key, a public key and/or a private key, which can be used in the secure uploading of data from an end user device (e.g., device 102) to a recipient device, such as application server 150 or another end user device (which may or may not include the secure services platform 110). The keys can be provided to various devices, including to a UICC of device 102, to an SDP of the device 102, to another end user device, and/or to the application server 150. The master key can be a static key that is stored in a memory of the RMS 120 or otherwise securely stored so as to be accessible to the RMS without being accessible by other devices, such as the device 102 or the application server 150.

The RMS 120 can include a derived encryption key generator (e.g., hardware and/or software) to generate a derived encryption key from the master key and from derivation data such as a set of static data. In one embodiment, the derived encryption key generator can apply a one-way function to the master key and to the set of static data for generating the derived encryption key. The one-way function can be of various types, including a hash, fractals, XOR(s), elliptic curves, and so forth. In one or more embodiments, the derivation or static data may be related to the UICC, the SDP, or both, such as device identification information, subscriber identification information, device parameters, device operating capability data, and so forth.

The RMS 120 can include public and/or private key generator(s) (hardware and/or software) for generating public and private nonce keys and/or public and private temporary encryption keys, such as using data related to the UICC, the SDP, or both. This data can be the same data that is used for generating the derived encryption key from the master key, or it can be different data. The public and private nonce keys and/or public and private temporary encryption keys can be distributed to various devices so that they are used for encrypting nonces and temporary encryption keys, respectively, The nonces and temporary encryption keys can be transmitted between devices to facilitate encryption and decryption of data being exchanged between the devices.

In one or more embodiments, the RMS 120 can create and load applications into both the secure element (e.g., the UICC 108) and the SDP 106 to facilitate encryption, decryption, nonce generation, synchronization detection, and so forth. The RMS 120 can also update the credentials and permissions that are stored in the various devices such as the UICC 108 and/or SDP 106. For example, these operations can be done securely by the use of one or more remote management keysets. These keysets can be used to mutually authenticate the UICC 108 and the SDP 106 with the RMS 120 and to enable encryption between them.

Figure 4:
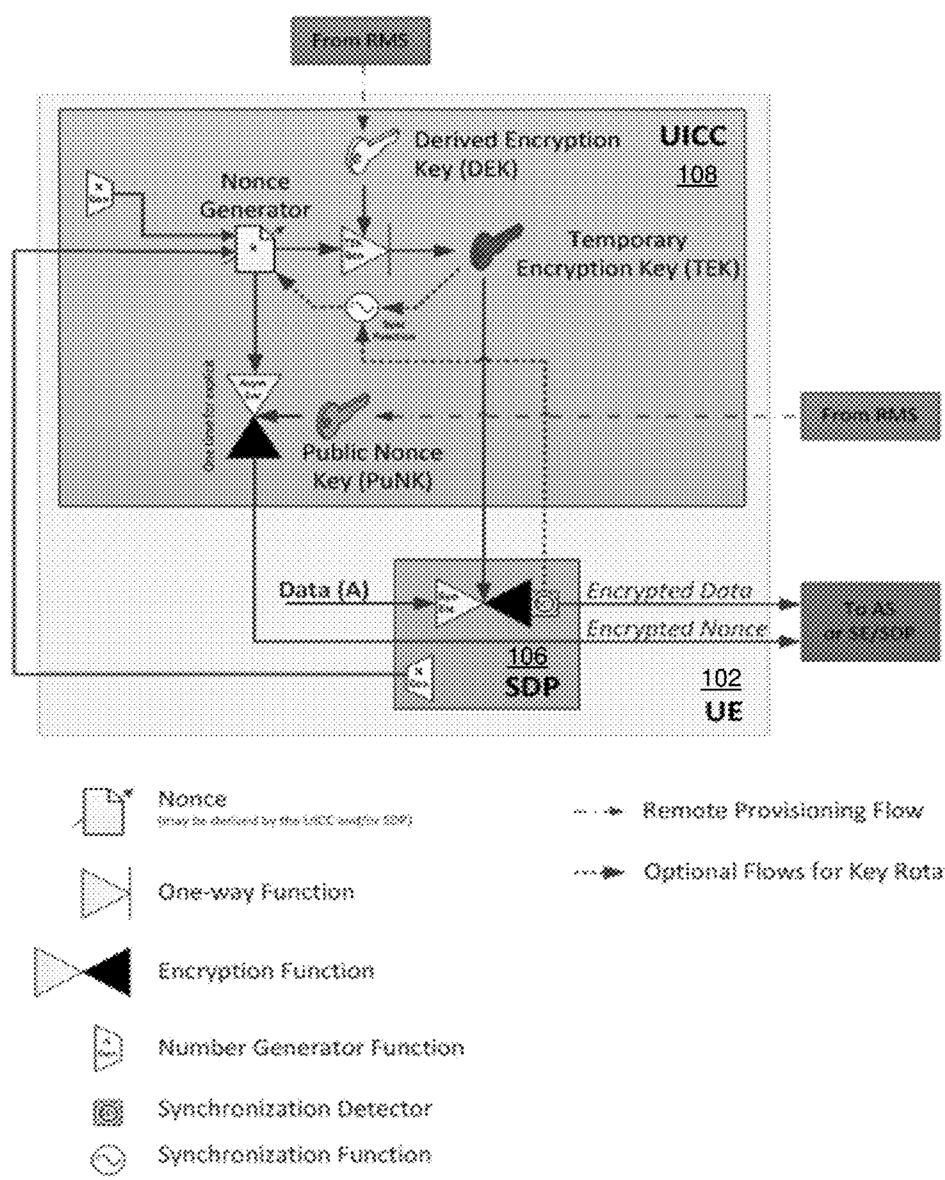
FIG. 4 depicts an illustrative embodiment of a system that utilizes synchronized key management for securely uploading or downloading data from or to a mobile communication device.

Referring to FIG. 4, system 400 is depicted which illustrates the communication device 102 encrypting data and encrypting a nonce which are transmitted to a recipient device such as an application server or another communication device. The UICC 108 can receive the derived encryption key from the RMS 120. The derived encryption key can be a fixed length, static key. In one embodiment, the derived encryption key is transmitted to the UICC 108 and to the application server (or other recipient device). Once received, the derived encryption key is not transmitted from the UICC 108, nor from the application server.

In one embodiment, the UICC 108 can include a temporary encryption key generator that applies a one-way function to generate a temporary encryption key from the derived encryption key and from a nonce. The one-way function can be of various types including a hash, fractals, elliptic curves, a Rabin function, and so forth. In one embodiment, several temporary encryption keys may be created and utilized during a single session. The temporary encryption keys may vary in size, and/or may use padding.

In one or more embodiments, the UICC 108 can include a number generator that generates numbers as inputs to a nonce generator. The numbers may be random or deterministic. The nonce generator can generate one or more nonces which are inputs to the temporary encryption key generator. A nonce can be a time-varying set of data used to derive temporary encryption keys. The nonce may be a combination (via concatenation, XOR(s), and so forth) of data (e.g., time stamp, random number, a previously generated temporary encryption key, and so forth).

In one or more embodiments, data for the creation of the nonce, such as a time stamp, may be provided by the SDP 106 and/or generated by the UICC 108. In one or more embodiments, the nonce is not repeated. In one or more embodiments, the size of nonces may change to produce temporary encryption keys of varying length. In one or more embodiments, the temporary encryption key can be a dynamically generated, symmetric key. The temporary encryption key may vary in size. The temporary encryption key may be transmitted from the UICC 108 to the SDP 106 (without providing the derived encryption key to the SDP 106). In one embodiment, the temporary encryption key may be transmitted from the UICC 108 to the application server (or other recipient device) via asymmetric encryption.

In one or more embodiments, the UICC 108 can perform a synchronization function, which can be used during in-session key rotation. For instance, the UICC 108 can respond to information provided by the SDP 106. The UICC 108 can generate a new nonce (e.g., may use a previous temporary encryption key, may cause the UICC and/or the SDP 106 to generate new numbers for the nonce, and so forth). The key rotation algorithm and parameters can be loaded and managed by the RMS 120.

In one or more embodiments, the UICC 108 can utilize a public nonce key (e.g., received from the RMS 120), which can be used for asymmetric encryption of the nonce. The public nonce key can also be stored in the SDP 106. In one or more embodiments, the UICC 108 can utilize a public temporary encryption key (e.g., received from the RMS 120), which can be used for asymmetrical encryption of the temporary encryption key. In one embodiment, the public temporary encryption key is stored in the UICC 108 without being accessible to the SDP 106).

In one or more embodiments, the SDP 106 can include an SDP encryption engine (hardware and/or software) which can encrypt a set of data using a temporary encryption key, such as via symmetric encryption (e.g., AES, TDES); can use block or stream encryption; can add pads; and/or can perform additional operations to ensure authenticity, message integrity, and non-repudiation (e.g., adding a hash, MAC, digital signature, and so forth). One or more of these operations may be used to support key verification. In one or more embodiments, the SDP encryption engine can use multiple temporary encryption keys per session; can request and receive a temporary encryption key from the UICC 108; and/or can determine when to request the temporary encryption key from the UICC (i.e., when to change keys). The changing of keys may be based on bits, blocks, time-based, and so forth.

In one or more embodiments, the SDP 106 can include a number generator that generates numbers as inputs to the nonce generator. The numbers may be random or deterministic. In one or more embodiments, the SDP 106 can include a synchronization detector used during in-session key rotation, which detects events that cause the SDP to request a key rotation. Events may include elapsed time and/or the number of encrypted blocks. The detection algorithm and parameters can be loaded and managed by the RMS 120.

Figure 5:
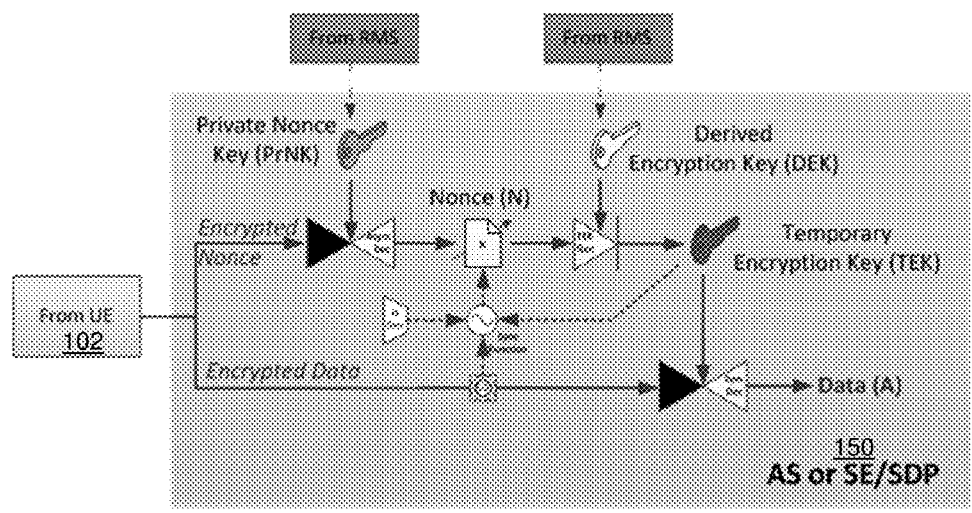
FIG. 5 depicts an illustrative embodiment of a system that utilizes implicit synchronized key management for securely uploading or downloading data from or to a mobile communication device.
Figure 5:
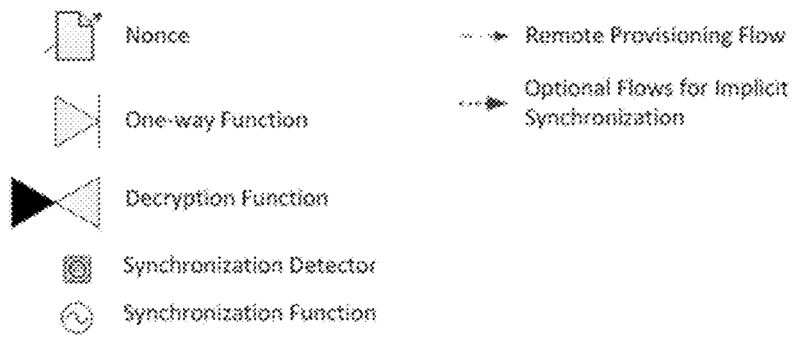
Figure 6:
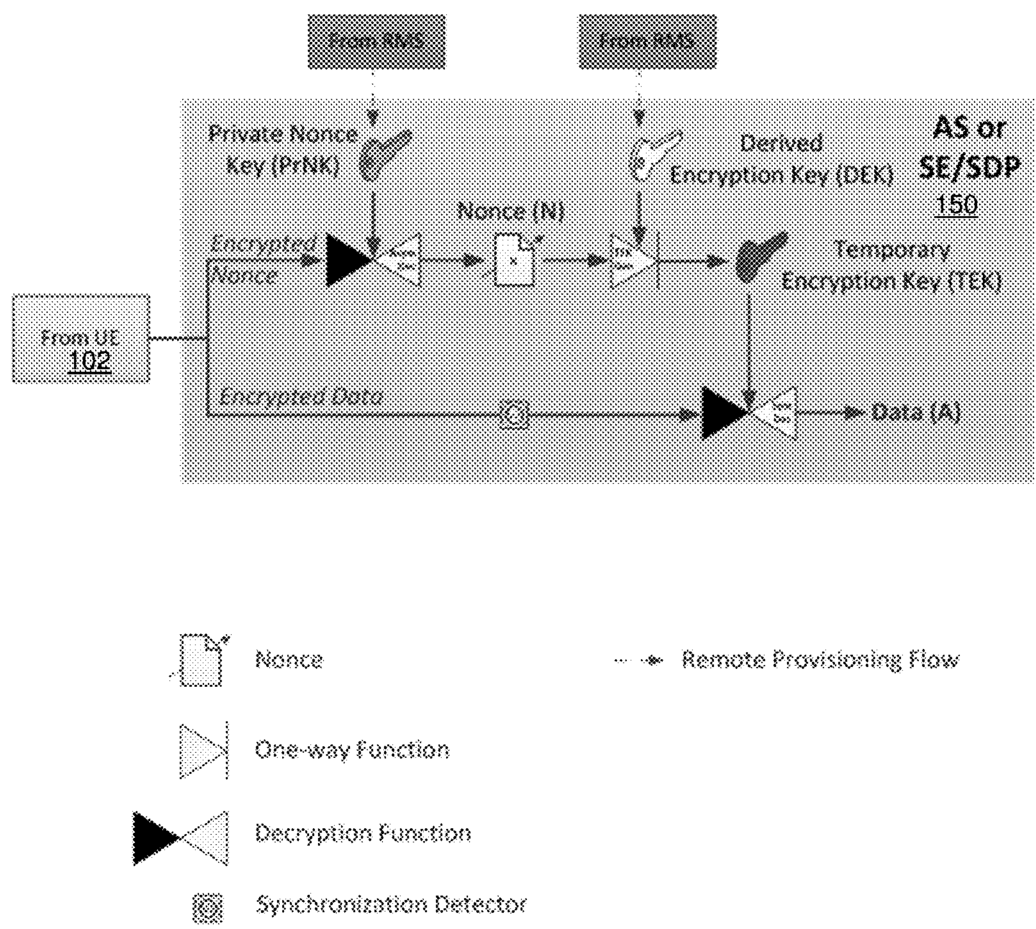
FIG. 6 depicts an illustrative embodiment of a system that utilizes explicit synchronized key management for securely uploading or downloading data from or to a mobile communication device.

Referring to FIGS. 5-6, systems 500 and 600 are depicted which illustrate recipient devices (such as an application server or another end user device) that receive encrypted data. In one or more embodiments, the application server 150 (or other recipient device) can support key synchronization. For example, the application server 150 can store the derived encryption key (received from the RMS 120), and includes a temporary encryption key generator that can generate temporary encryption keys using the received derived encryption key and a nonce. In one embodiment, the application server 150 can decrypt nonces received from the device 102 using a private nonce key, such as received from the RMS 120.

Two examples of modes of key management operation are synchronization and encrypted key exchange for an upload of data from the device 102 to the application server 150 (or other recipient device). In the synchronization mode, the exemplary embodiments can utilize implicit or explicit synchronization. For example in implicit synchronization depicted in system 500, the initial nonce can be provided in encrypted form by the device 102 to the application server 150. The application server 150 can generate the first temporary encryption key using its own temporary encryption key generator, its derived encryption key, and the initial nonce (which is decrypted utilizing a private nonce key received from the RMS 120). Subsequent temporary encryption keys can be generated using the same algorithm used by the UICC (e.g., time stamps, previous temporary encryption keys, and so forth).

As an example for explicit synchronization depicted in system 600, the nonce can be provided to the application server 150 in encrypted form upon every temporary encryption key creation. The application server 150 can generate a temporary encryption key using its own temporary encryption key generator, its derived encryption key, and the most recently received nonce. The nonce may be encrypted by the end user device 102 using the public nonce key (received from the RMS 120) corresponding to the application server 150. Temporary encryption keys may be rotated (e.g., during a single communication session).

In one or more embodiments, the application server 150 can support encrypted key exchange. In one or more embodiments, the application server 150 can decrypt encrypted temporary encryption keys received from the device using its private key. The application server 150 can decrypt received data using a temporary encrypted key. The application server 150 can perform additional operations to ensure authenticity, message integrity, and non-repudiation (e.g., adding a hash, MAC, digital signature, and so forth). These operations can be used to verify that the correct key is being used to decrypt the data.

If operating in explicit synchronization mode, the application server 150 can utilize a synchronization detector. If operating in implicit synchronization mode, the application server 150 can utilize a synchronization detector and synchronization function. Both can be configured similarly or identically to the corresponding ones in the UICC/SDP and remotely managed by the RMS 120.

Figure 7:
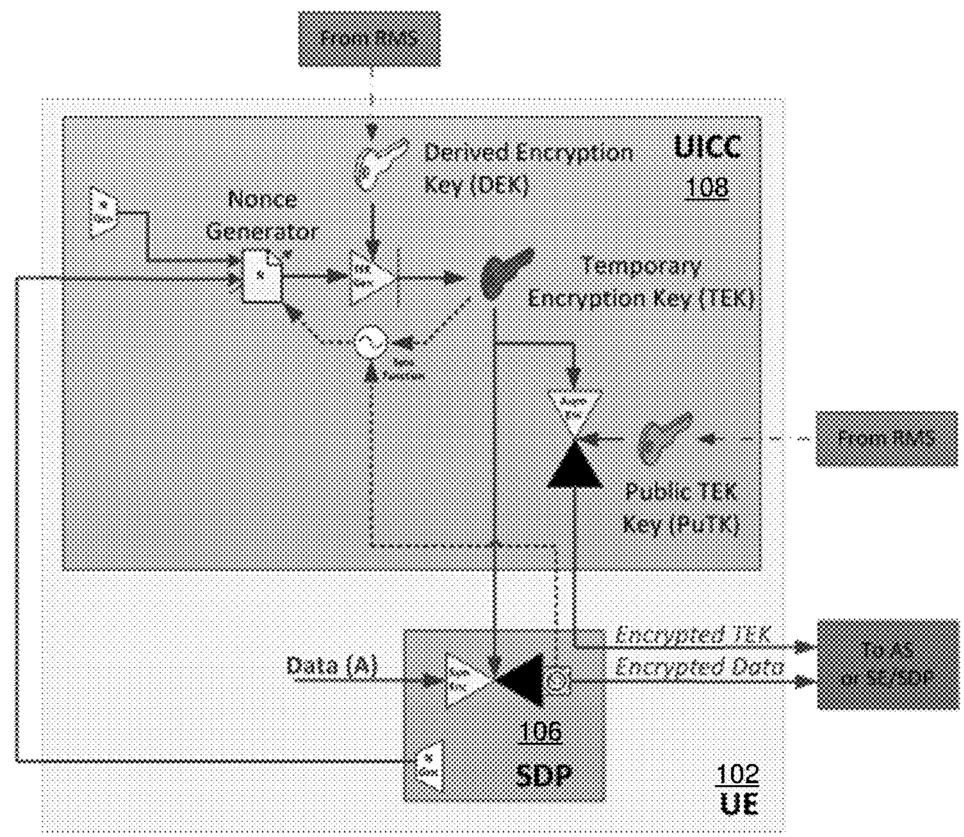
FIG. 7 depicts an illustrative embodiment of a system including an end user device that utilizes key exchange for securely uploading or downloading data from or to a mobile communication device.
Figure 7:
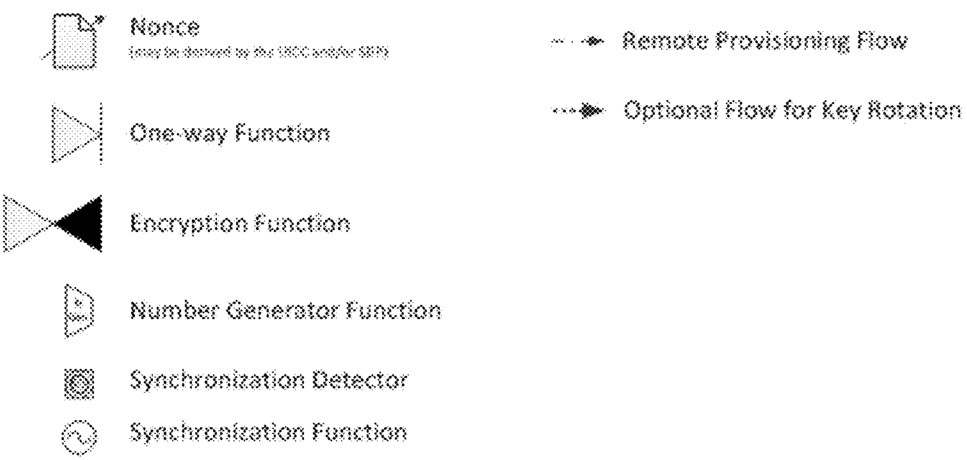
Figure 8:
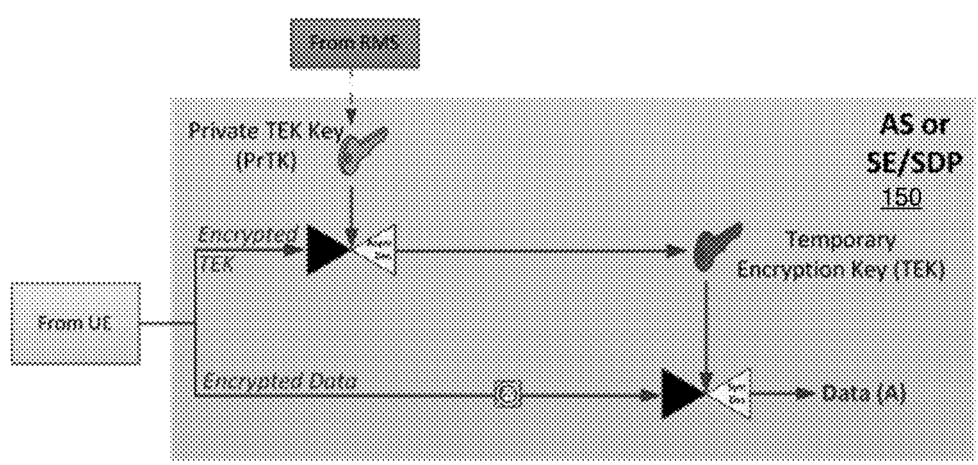
FIG. 8 depicts an illustrative embodiment of a system including an application server that utilizes key exchange for securely uploading or downloading data from or to a mobile communication device.

Referring additionally to FIG. 7, system 700 is depicted which illustrates the communication device 102 that provides the encrypted data along with an encrypted temporary encryption key. System 700 utilizes the encrypted key exchange mode of operation, in which the SDP (or the UICC) can encrypt the temporary encryption key using a public key (corresponding to or otherwise associated with the application server 150 (or other recipient device) which is received from RMS 120) and can transmit the encrypted temporary encryption key to the application server. The application server 150 can then decrypt the encrypted temporary encryption key utilizing a private key received from the RMS 120 to access the temporary encryption key. This enables the application server 150 to decrypt the encrypted data with the temporary encryption key as shown in system 800 of FIG. 8.

Figure 9:
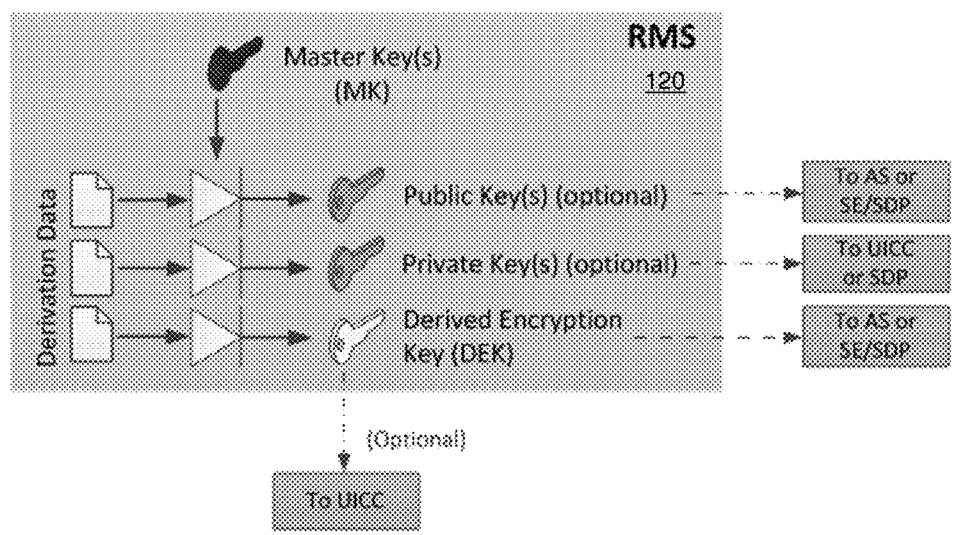
FIG. 9 depicts another illustrative embodiment of a system that utilizes a remote management server for distributing keys used for securely uploading or downloading data from or to a mobile communication device.
Figure 9:
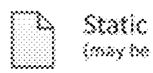

Referring to FIG. 9, a system 900 is depicted which illustrates the RMS 120 securely storing a master key and generating keys from the master key, such as a derived encryption key, a public key and/or a private key, which can be used to enable an end user device (e.g., communication device 102) to securely download data. The keys can be provided to various devices, including to a UICC of device 102, to an SDP of the device 102, to another end user device, and/or to the application server 150. The master key can be a static key that is stored in a memory of the RMS 120 or otherwise securely stored so as to be accessible to the RMS without being accessible by other devices, such as the device 102 or the application server 150.

The RMS 120 can generate the derived encryption key from the master key and a set of static data by applying a one-way function to the master key and the derivation data or set of static data. The one-way function can be of various types, including a hash, fractals, XOR(s), a Rabin function, elliptic curves, and so forth. In one or more embodiments, the data may be related to the UICC, the SDP (or both) and/or to the application server 150, such as device identification information, subscriber identification information, device parameters, device operating capability data, and so forth.

The RMS 120 can generate public and private nonce keys and/or public and private temporary encryption keys, such as using data related to the UICC, the SDP (or both), or the application server (or other source device). This data can be the same data that is used for generating the derived encryption key or can be different data. The public and private nonce keys and/or public and private temporary encryption keys can be used for encrypting nonces and temporary encryption keys, respectively, so that the nonces and temporary encryption keys can be transmitted between devices to facilitate encryption and decryption of data being exchanged between the devices.

Figure 10:
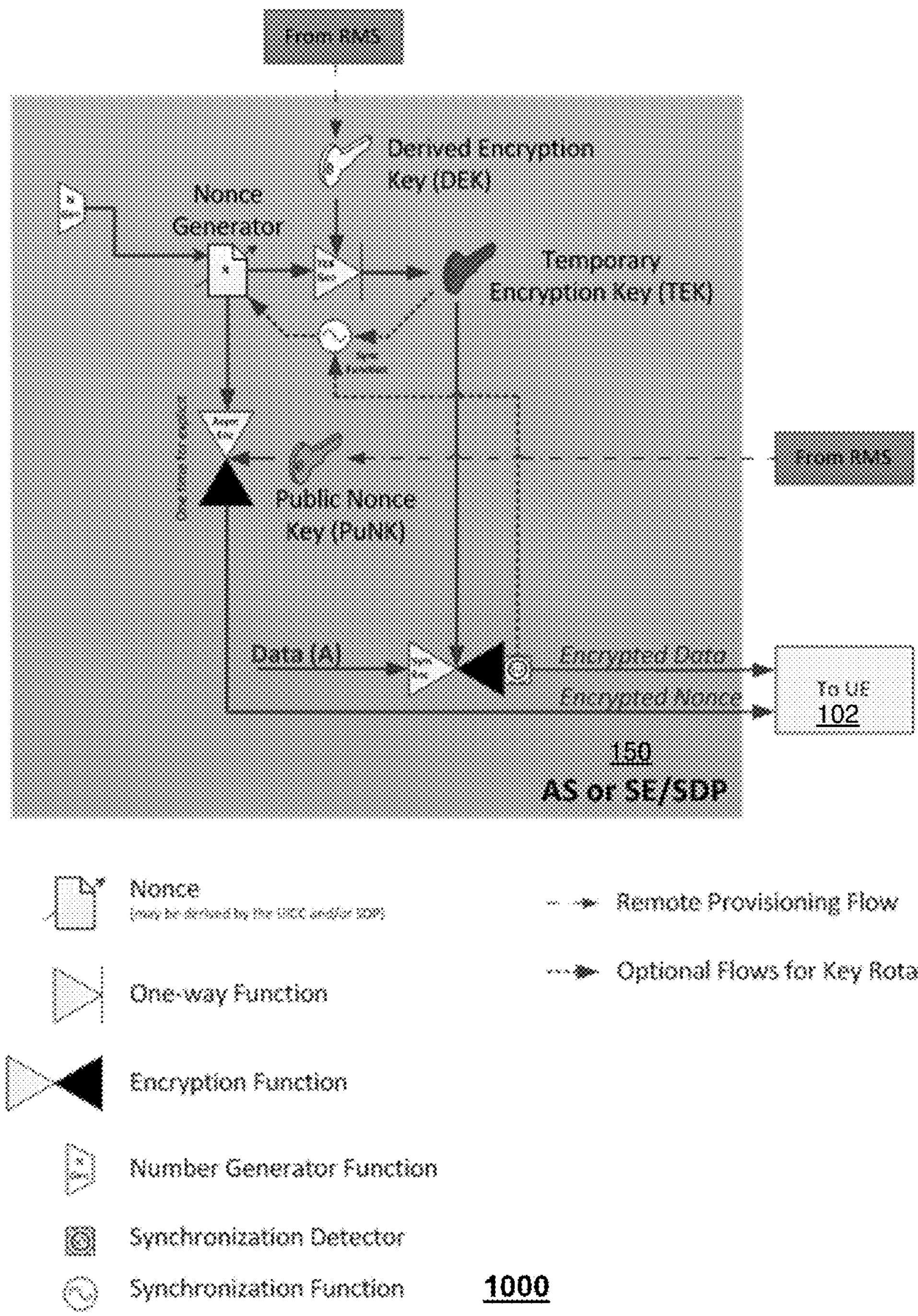
FIG. 10 depicts another illustrative embodiment of a system that utilizes synchronized key management for securely uploading or downloading data from or to a mobile communication device.

Referring to FIG. 10, system 1000 is depicted which illustrates the source device (e.g., application server 150) encrypting data and encrypting a nonce which are transmitted to the end user device 102. The application server 150 can receive the derived encryption key from the RMS 120. The derived encryption key can be a fixed length, static key. In one embodiment, the derived encryption key can be transmitted to the UICC 108 and to the application server 150 (or other source device) by the RMS 120. Once received, the derived encryption key is not transmitted from the application server 150, nor from the UICC 108.

In one embodiment, the application server 150 can include a temporary encryption key generator that applies a one-way function to generate a temporary encryption key from the derived encryption key and from a nonce. The one-way function can be of various types including a hash, fractal function, XOR(s) and so forth. In one embodiment, several temporary encryption keys may be created and used during a single session. The temporary encryption keys may vary in size, and/or may use padding.

In one or more embodiments, the application server 150 can include a number generator that generates numbers as inputs to a nonce generator. The numbers may be random or deterministic. The nonce generator can generate one or more nonces which are inputs to the temporary encryption key generator. A nonce can be a time-varying set of data used to derive temporary encryption keys. The nonce may be a combination (via concatenation, XOR(s), and so forth) of data (e.g., time stamp, random number, and/or a previously generated temporary encryption key).

In one or more embodiments, the nonce is not repeated. In one or more embodiments, the size of nonces may change to produce temporary encryption keys of varying length. In one or more embodiments, the temporary encryption key can be a dynamically generated, symmetric key. The temporary encryption key may vary in size. In one embodiment, the temporary encryption key may be transmitted from the application server 150 (or other source device) to the UICC 108 (or other recipient device) via asymmetric encryption.

In one or more embodiments, the application server 150 can perform a synchronization function, which can be used during in-session key rotation. For instance, the application server 150 can generate a new nonce (e.g., may use a previous temporary encryption key, may cause the generation of new numbers that are utilized in generating the nonce, and so forth). The key rotation algorithm and parameters can be loaded and managed by the RMS 120.

In one or more embodiments, the application server 150 can utilize a public nonce key received from the RMS 120, which can be used for asymmetric encryption of the nonce. In one or more embodiments, the application server 150 can utilize a public temporary encryption key received from the RMS 120, which can be used for asymmetrical encryption of the temporary encryption key.

In one or more embodiments, the application server 150 can include an encryption engine (hardware and/or software) which can encrypt a set of data using a temporary encryption key, such as via symmetric encryption (e.g., AES, TDES); can use block or stream encryption; can add pads; and can perform additional operations to ensure authenticity, message integrity, and non-repudiation (e.g., adding a hash, MAC, digital signature, and so forth). These operations may be used to support key verification. In one or more embodiments, the encryption engine can use multiple temporary encryption keys per session. The changing of keys may be based on bits, blocks, time-based, and so forth.

In one or more embodiments, the application server 150 can include a synchronization detector used during in-session key rotation, which detects events that cause the application server 150 to invoke a key rotation. Events may include elapsed time and/or the number of encrypted blocks. The detection algorithm and parameters can be loaded and managed by the RMS 120.

Figure 11:
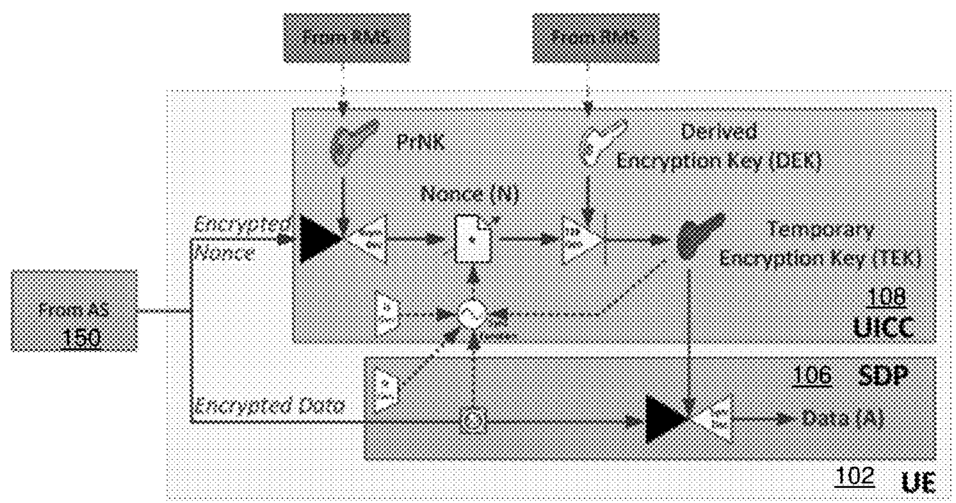
FIG. 11 depicts another illustrative embodiment of a system that utilizes implicit synchronized key management for securely uploading or downloading data from or to a mobile communication device.
Figure 11:
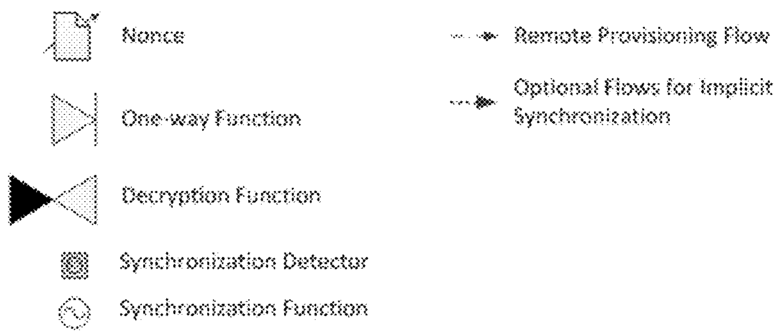
Figure 12:
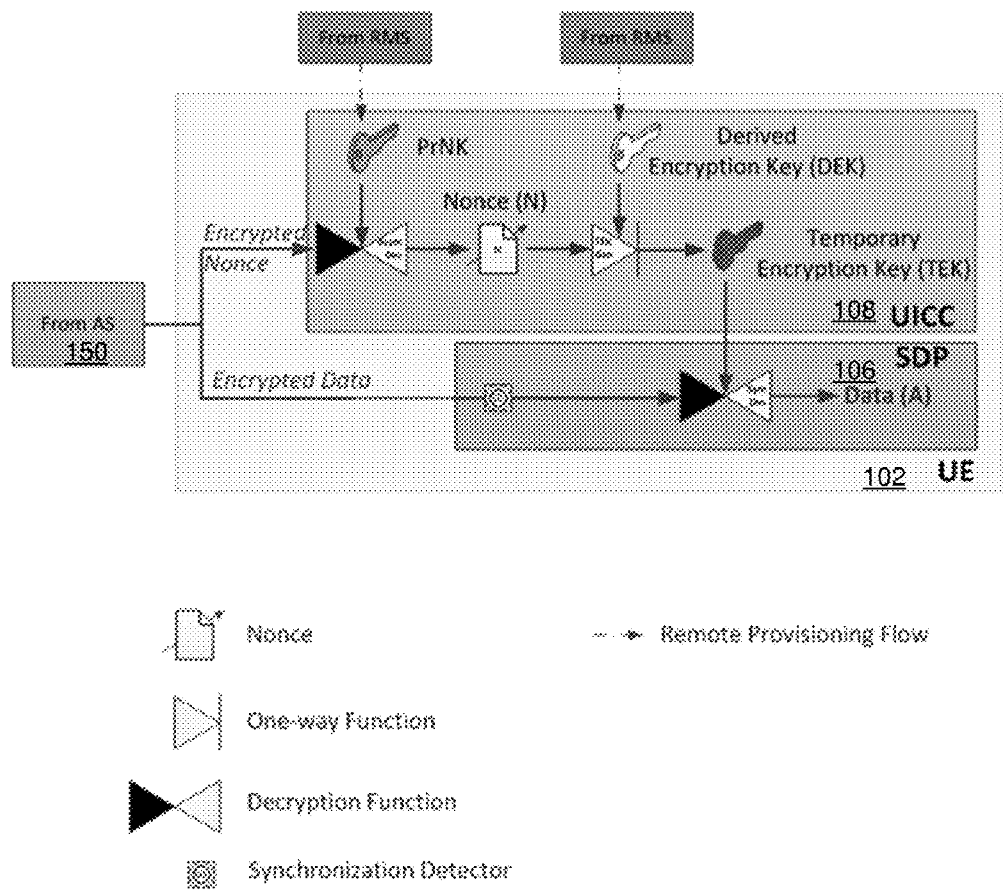
FIG. 12 depicts another illustrative embodiment of a system that utilizes explicit synchronized key management for securely uploading or downloading data from or to a mobile communication device.

Referring to FIGS. 11-12, systems 1100 and 1200 are depicted which illustrate the end user device 102 receiving encrypted data and an encrypted nonce. System 1100 depicts an example of implicit synchronized key management, while system 1200 depicts an example of explicit synchronized key management. In one or more embodiments, the end user device 102 can support key synchronization. For example, the end user device 102 can store the derived encryption key (received from the RMS 120), and includes a temporary encryption key generator that can generate temporary encryption keys using the received derived encryption key and a nonce. In one embodiment, the end user device 102 can decrypt encrypted nonces received from the device 102 using a private nonce key, such as received from the RMS 120.

Figure 13:
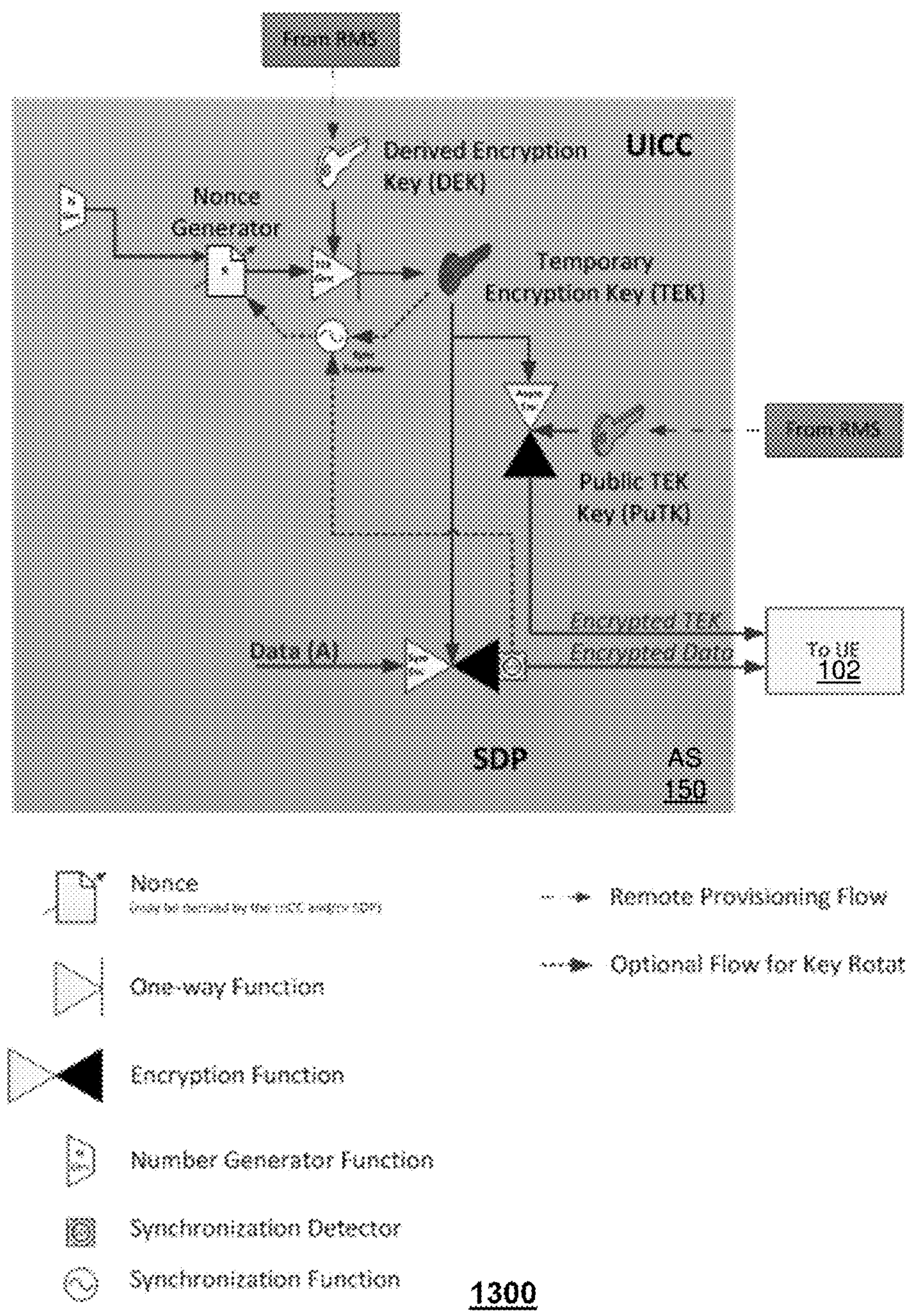
FIG. 13 depicts another illustrative embodiment of a system including an application server that utilizes key exchange for securely uploading or downloading data from or to a mobile communication device.

Referring additionally to FIG. 13, system 1300 depicts the application server 150 (or other source device) providing the encrypted data and the encrypted temporary encryption key to the end user device 102 (or other recipient device) in an encrypted key exchange mode where the end user device 102 is requesting the download of data. The modes of operation for systems 1100, 1200 and 1300 are synchronization and encrypted key exchange for a download of data from the application server 150 (or other source device) to the end user device 102 (or other recipient device). In the synchronization mode, the exemplary embodiments can utilize implicit or explicit synchronization. For example in implicit synchronization shown in system 1100, the initial nonce can be provided by the application server 150 to the device 102 (e.g., to the UICC 108 in encrypted form). The UICC 108 can generate the first temporary encryption key using its own temporary encryption key generator, its derived encryption key (received from RMS 120), and the initial nonce (which has been decrypted using a private nonce key received from RMS 120). Subsequent temporary encryption keys can be generated using the same algorithm used by the application server 150 (e.g., time stamps, previous temporary encryption keys, and so forth). As an example for explicit synchronization shown in system 1200, the nonce (in encrypted form) can be provided to the end user device 102 (e.g., the UICC 108) by the application server 150 (or other source device) upon every temporary encryption key creation. The UICC 108 can generate a temporary encryption key using its own temporary encryption key generator, its derived encryption key, and the most recently received nonce. The nonce may be encrypted by the application server 150 using the public key of the application server and then decrypted by the UICC 108 using the private key of the UICC. Temporary encryption keys may be rotated (e.g., during a single communication session).

Figure 14:
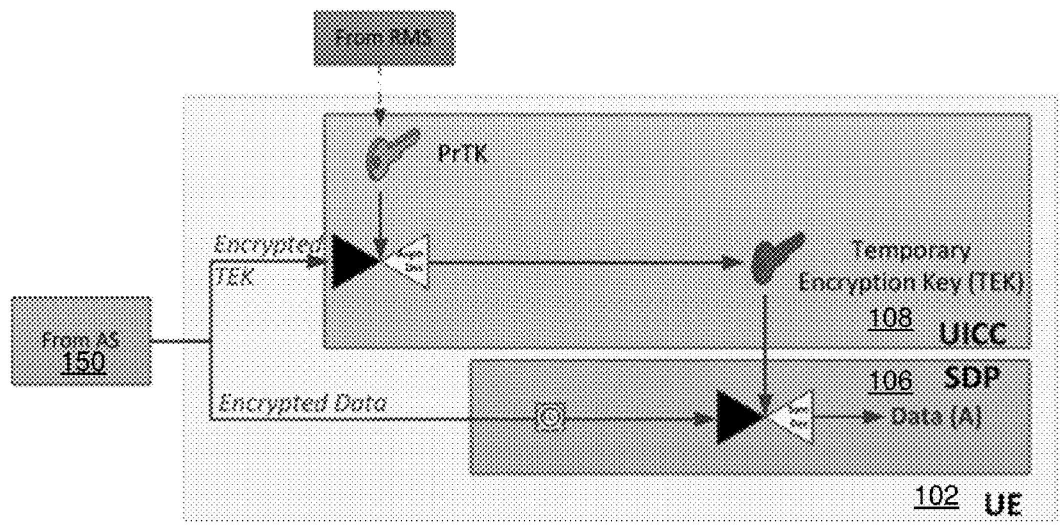
FIG. 14 depicts another illustrative embodiment of a system including an end user device that utilizes key exchange for securely uploading or downloading data from or to a mobile communication device.

Referring additionally to FIG. 14, system 1400 is depicted which illustrates the communication device 102 that receives the encrypted data along with the encrypted temporary encryption key. System 1400 utilizes the encrypted key exchange mode of operation, in which the UICC 108 can decrypt the temporary encryption key using a private key (corresponding to or otherwise associated with the application server 150 (or other source device)).

Figure 15:
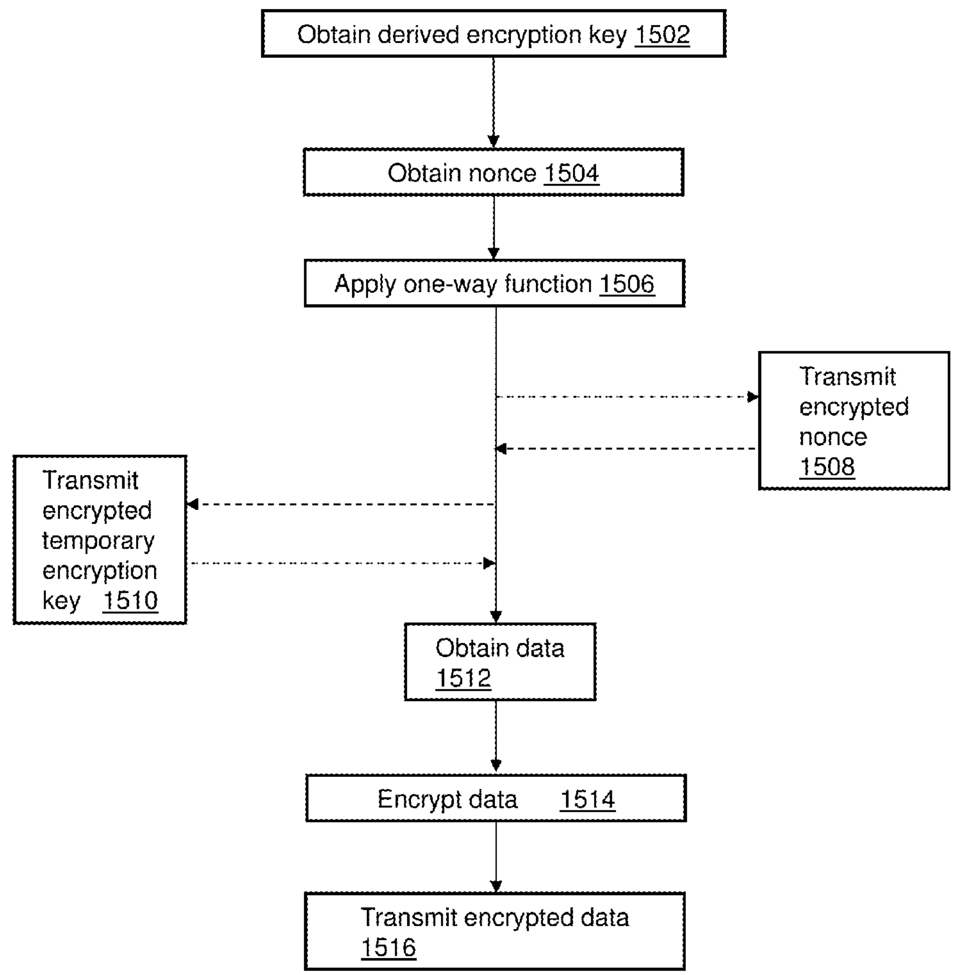
FIG. 15 depicts an illustrative embodiment of a method used in portions of the systems described in FIGS. 1-14.

FIG. 15 depicts an illustrative embodiment of a method for providing secure upload or delivery of data between devices using key management. Method 1500 is described as being performed by the communication device 102, however, various other devices or individual components of devices can perform all or a portion of method 1500, including the SDP 106, the secure element 108, the application server/recipient device 150, and so forth. More or less than the steps described in method 1500 can be performed in one or more exemplary embodiments, and the order of steps can be rearranged.

Method 1500 can begin at 1502 where a derived encryption key is obtained. For example, the communication device 102 can receive (e.g., via a wireless transmission) the derived encryption key from RMS 120 without receiving a master key. In this example, the RMS 120 can generate the derived encryption key from a master key stored by or otherwise accessible to the RMS. The master key can be a static key. In one embodiment, the master key is securely stored and rendered inaccessible to devices other than the RMS 120. In one embodiment, the RMS 120 cam include a derived encryption key generator (which can be hardware and/or software) that applies or otherwise utilizes a one-way function to generate the derived encryption key from the master key and a set of static data. As an example, the data can be related to the UICC or the SDP (or both) of the communication device requesting or otherwise being provided with the derived encryption key. The one-way functions can be various types including hash functions, fractals, XOR(s), and so forth.

At 1504, the device 102 can obtain a nonce, such as from a nonce generator. At 1506, the device 102 can apply a one-way function to the derived encryption key and to the nonce to generate a temporary encryption key. In one embodiment at 1508, the device 102 can receive a public nonce key from the RMS 120, can encrypt the nonce using the public nonce key to generate an encrypted nonce, and can provide the encrypted nonce over the network to a recipient device to enable the recipient device to decrypt the encrypted nonce using a private nonce key received by the recipient device from the RMS. In another embodiment at 1510, the device 102 can receive a public temporary encryption key from the RMS 120, can encrypt the temporary encryption key using the public temporary encryption key to generate an encrypted temporary encryption key, and can provide the encrypted temporary encryption key over the network to the recipient device to enable the recipient device to decrypt the encrypted temporary encryption key using a private temporary encryption key received by the recipient device from the RMS. In one or more embodiments, the RMS 120 can include public and/or private key generators for generating public and private nonce keys and/or public and private temporary encryption keys, such as by using data related to the UICC, the SDP, or both.

At 1512, the device 102 can obtain data for transmission to the recipient device (which can be various types of devices such as an application server or another end user device including fixed or mobile end user devices). At 1514, the device 102 can encrypt the data using the temporary encryption key to generate encrypted data. At 1516, the device 102 can provide the encrypted data over the network to the recipient device. In one embodiment, the device 102 can detect a key rotation event and can generate a second temporary encryption key responsive to the detecting of the key rotation event. The second temporary encryption key can be used similar to the original temporary encryption key for encrypting additional data. In this example, the generating of the second temporary encryption key can be during the same communication session. As an example, the lifetime of a temporary encryption key may be pre-determined (e.g., hard coded in both the SDP and the AS (or other recipient device)). The temporary encryption key lifetime can also vary. In one embodiment, the lifetime of a temporary encryption key can be defined by block size or by number of bits, or by some other parameter. This can involve a detection mechanism. Subsequent temporary encryption keys can be generated using newly created nonces. For explicit synchronization, newly created nonces can be sent to the application server 150 or other recipient device. They may be encrypted using the public key of the application server or other recipient device. For implicit synchronization, the synchronization function of the device 102 (e.g., located in the UICC 108) can use the same algorithm and parameters as the application server or other recipient device. Both the UICC 108 and the application server 150 or other recipient device can use an initial nonce that is transmitted from the device 102 to the application server or other recipient device at the beginning of the communication session. The initial nonce may be encrypted using the public key of the application server or other recipient device. The algorithms and parameters can be installed and updated remotely by the RMS 120. For key exchange, the temporary encryption key can be encrypted using the public key of the application server or other recipient device sent to the application server or other recipient device. The application server 150 or other recipient device can have a detector to determine when a new key is required.

In one embodiment, a user that is associated with a data transfer request (e.g., a request to upload to an application server, a request to transfer data to a removable memory device, a request to transmit data to another end user device or other device, and so forth) can be authenticated. For instance, the authentication can be based on a user credential (s) that is received by the SDP 106 via user input at the device 102, where the user credential is compared with a corresponding user credential stored by the secure element 108. Various types of user credentials can be used for user authentication, including user identification information, passwords, biometric data, and so forth. Various other types of authentication processes can be implemented at the mobile device 102, such as described in U.S. application Ser. No. 14/061,380 filed on Oct. 23, 2013, the disclosure of which is hereby incorporated by reference.

In one or more embodiments, the data transfer request can be initiated based on user input at the device 102. However, the data transfer request can also be initiated by other sources, such as a request initiated by an application being executed on the device 102, which may or may not require user authentication. In one embodiment of this example, the data transfer request can be performed automatically without notice being provided to the user of the device 102. In another embodiment of this example, the data transfer request can be initiated automatically but can provide notice or request authorization from the user to proceed, such as a notice or permission request being presented at the device 102. In another embodiment, the data transfer request can be initiated by another device, which may or may not require user authentication. For instance, an application server or another end user device may transmit the data transfer request to the device 102 where it is processed by the SDP 106.

Figure 16:
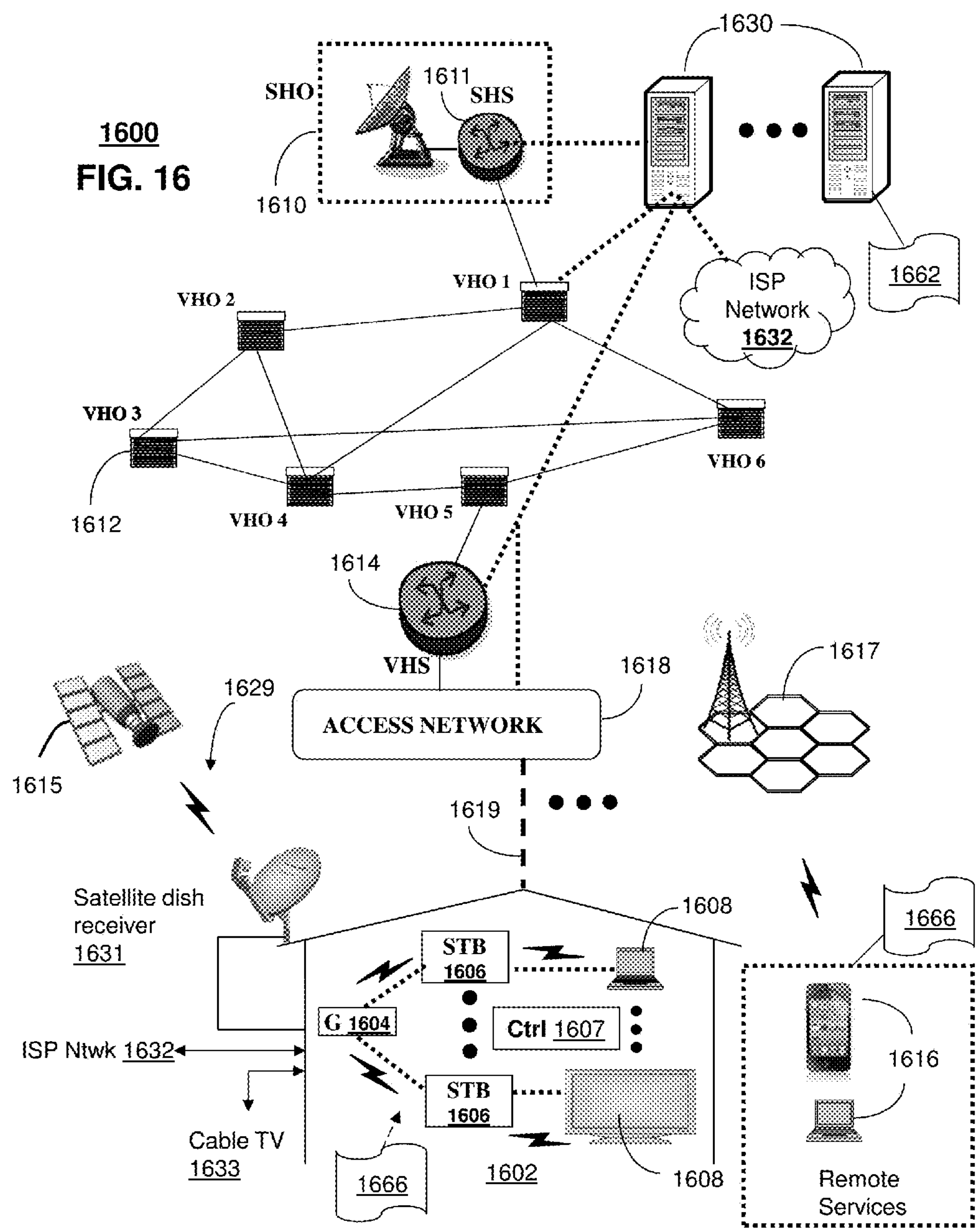
FIG. 16 depicts an illustrative embodiment of a communication system that provides media services including securely uploading or otherwise delivering data between a mobile communication device and a recipient device utilizing encryption key management.

FIG. 16 depicts an illustrative embodiment of a communication system 1600 for delivering media content. The communication system 1600 can represent an Internet Protocol Television (IPTV) media system. Communication system 1600 can be overlaid or operably coupled with systems 100, 200 of FIGS. 1 and 2 as another representative embodiment of communication system 1600. In one or more embodiments, system 1600 enables utilizing one or more of implicit synchronization, explicit synchronization and key exchange for delivering data to a recipient device, where the data is encrypted and/or modified utilizing a temporary encryption key that is generated from a master key securely stored by a remote management server.

System 1600 can enable data (e.g., video content, image content, audio content, application data, gaming data, and so forth) to be securely uploaded from or downloaded to a mobile communication device responsive to a request that is initiated by a user, by the mobile communication device, by a network device (e.g., the application server), and/or by another communication device (e.g., another end user device). In one or more embodiments, one-way functions, such as hash functions, fractals, XOR(s), and so forth, can be used for generating derived encryption keys from master keys, and can be used for generating temporary encryption keys from derived encryption keys. The one-way functions can be utilized in conjunction with a data set (e.g., static data associated with the UICC and/or SDP of the end user device that will receive the downloaded data or provide the uploaded data) or in conjunction with a nonce.

The IPTV media system can include a super head-end office (SHO) 1610 with at least one super headend office server (SHS) 1611 which receives media content from satellite and/or terrestrial communication systems. In the present context, media content can represent, for example, audio content, moving image content such as 2D or 3D videos, video games, virtual reality content, still image content, and combinations thereof. The SHS server 1611 can forward packets associated with the media content to one or more video head-end servers (VHS) 1614 via a network of video head-end offices (VHO) 1612 according to a multicast communication protocol.

The VHS 1614 can distribute multimedia broadcast content via an access network 1618 to commercial and/or residential buildings 1602 housing a gateway 1604 (such as a residential or commercial gateway). The access network 1618 can represent a group of digital subscriber line access multiplexers (DSLAMs) located in a central office or a service area interface that provide broadband services over fiber optical links or copper twisted pairs 1619 to buildings 1602. The gateway 1604 can use communication technology to distribute broadcast signals to media processors 1606 such as Set-Top Boxes (STBs) which in turn present broadcast channels to media devices 1608 such as computers or television sets managed in some instances by a media controller 1607 (such as an infrared or RF remote controller).

The gateway 1604, the media processors 1606, and media devices 1608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies (Bluetooth® and ZigBee® are trademarks registered by the Bluetooth Special Interest Group and the ZigBee Alliance, respectively). By way of these interfaces, unicast communications can also be invoked between the media processors 1606 and subsystems of the IPTV media system for services such as video-on-demand (VoD), browsing an electronic programming guide (EPG), or other infrastructure services.

A satellite broadcast television system 1629 can be used in the media system of FIG. 16. The satellite broadcast television system can be overlaid, operably coupled with, or replace the IPTV system as another representative embodiment of communication system 1600. In this embodiment, signals transmitted by a satellite 1615 that include media content can be received by a satellite dish receiver 1631 coupled to the building 1602. Modulated signals received by the satellite dish receiver 1631 can be transferred to the media processors 1606 for demodulating, decoding, encoding, and/or distributing broadcast channels to the media devices 1608. The media processors 1606 can be equipped with a broadband port to an Internet Service Provider (ISP) network 1632 to enable interactive services such as VoD and EPG as described above.

In yet another embodiment, an analog or digital cable broadcast distribution system such as cable TV system 1633 can be overlaid, operably coupled with, or replace the IPTV system and/or the satellite TV system as another representative embodiment of communication system 1600. In this embodiment, the cable TV system 1633 can also provide Internet, telephony, and interactive media services.

The subject disclosure can apply to other present or next generation over-the-air and/or landline media content services system.

Some of the network elements of the IPTV media system can be coupled to one or more computing devices 1630, a portion of which can operate as a web server for providing web portal services over the ISP network 1632 to wireline media devices 1608 or wireless communication devices 1616.

Communication system 1600 can also provide for computing devices 1630 to function as a remote management server and/or an application server (herein referred to as server 1630). The server 1630 can use computing and communication technology to perform function 1662, which can include among other things, provisioning various devices or components, such as through use of remote management keysets. The provisioning can be of applications and/or can be of keysets, such as derived encryption keys, public keys, private keys, and so forth. Function 1662 can include one or more of storing a master key; obtaining derivation data associated with an end user device; applying a one-way function to the master key and the derivation data to generate a derived encryption key; providing the derived encryption key to a UICC of the end user device to enable the UICC to generate a temporary encryption key for encrypting data where the master key is not provided by the remote management server to the end user device; providing a public nonce key to the UICC to enable the UICC to encrypt a nonce to generate an encrypted nonce; providing a private nonce key to an application server to enable the application server to decrypt the encrypted nonce that is received by the application server from the end user device; providing the derived encryption key to the application server to enable the application server to decrypt encrypted data using the derived encryption key and the nonce where the encrypted data is received by the application server from the end user device; providing a public temporary encryption key to the UICC of the end user device to enable the UICC to encrypt a temporary encryption key to generate an encrypted temporary encryption key; and providing a private temporary encryption key to an application server to enable the application server to decrypt the encrypted temporary encryption key that is received by the application server from the end user device.

Function 1662 can also include receiving a derived encryption key from an RMS without receiving a master key from which the derived encryption key was generated; applying a one-way function to the derived encryption key and a nonce to generate a temporary encryption key; obtaining data for transmission to a recipient device; encrypting the data using the temporary encryption key to generate encrypted data; providing the encrypted data over a network to the recipient device; receiving a public nonce key from the RMS; encrypting the nonce using the public nonce key to generate an encrypted nonce; providing the encrypted nonce over the network to the recipient device to enable the recipient device to decrypt the encrypted nonce using a private nonce key received by the recipient device from the RMS; receiving a public temporary encryption key from the RMS; encrypting the temporary encryption key using the public temporary encryption key to generate an encrypted temporary encryption key; providing the encrypted temporary encryption key over the network to the recipient device to enable the recipient device to decrypt the encrypted temporary encryption key using a private temporary encryption key received by the recipient device from the RMS; detecting a key rotation event; and generating a second temporary encryption key responsive to the detecting of the key rotation event.

Function 1666 can include functions being performed at one or both of the secure element 108 and the SDP 106 including one or more of receiving a derived encryption key from an RMS without receiving a master key from which the derived encryption key was generated; applying a one-way function to the derived encryption key and a nonce to generate a temporary encryption key; receiving the temporary encryption key at the SDP from the secure element without receiving the derived encryption key; obtaining data for transmission to a recipient device; encrypting the data using the temporary encryption key to generate encrypted data; providing the encrypted data over a network to the recipient device; generating a number; generating the nonce from the number where the nonce comprises a non-repeating data set that includes a time stamp; receiving a public nonce key from the RMS; encrypting the nonce using the public nonce key to generate an encrypted nonce; receiving the encrypted nonce from the secure element; providing the encrypted nonce over the network to the recipient device to enable the recipient device to decrypt the encrypted nonce using a private nonce key received by the recipient device from the RMS; receiving a public temporary encryption key from the RMS; encrypting the temporary encryption key using the public temporary encryption key to generate an encrypted temporary encryption key; receiving the encrypted temporary encryption key at the SDP from the secure element; providing the encrypted temporary encryption key over the network to the recipient device to enable the recipient device to decrypt the encrypted temporary encryption key using a private temporary encryption key received by the recipient device from the RMS; monitoring for a key rotation event; providing a key rotation request to the secure element responsive to detecting the key rotation event; generating a second temporary encryption key responsive to the request for the key rotation; generating a time stamp; providing the number and the time stamp to the secure element; generating the nonce from the number and the time stamp; receiving a private nonce key from the RMS; receiving an encrypted second nonce from the recipient device; decrypting the nonce using the private nonce key to generate a second nonce; applying the one-way function to the derived encryption key and the second nonce to generate a second temporary encryption key; receiving encrypted second data from the recipient device; receiving the second temporary encryption key at the SDP from the secure element; and decrypting the encrypted second data using the second temporary encryption key.

Multiple forms of media services can be offered to media devices over landline technologies such as those described above. Additionally, media services can be offered to media devices by way of a wireless access base station 1617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 17:
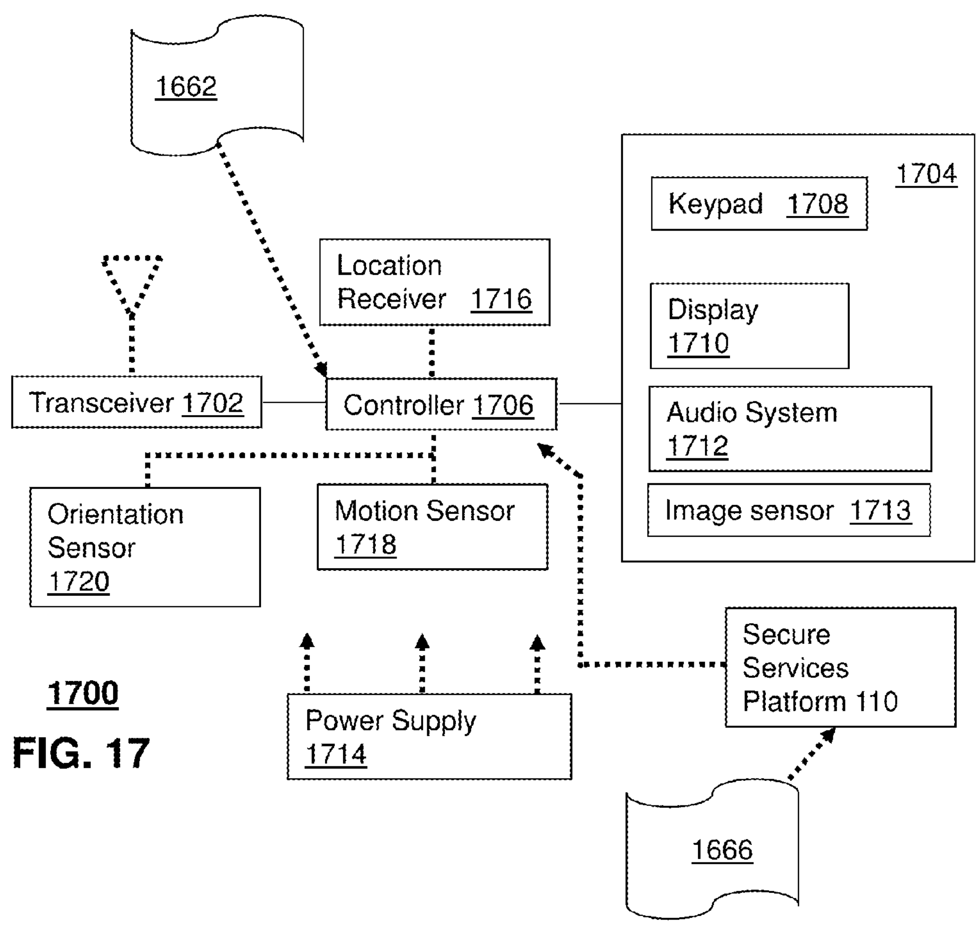
FIG. 17 depicts an illustrative embodiment of a communication device that can provide for secure upload or otherwise delivery of data between a mobile communication device and a recipient device utilizing encryption key management.

FIG. 17 depicts an illustrative embodiment of a communication device 1700. Communication device 1700 can serve in whole or in part as an illustrative embodiment of the devices depicted in FIGS. 1-14 and 16. For instance, device 1700 can include a secure element and a secure device processor in the secure services platform 110 which perform the functions described in the exemplary embodiments herein.

In one or more embodiments, the secure element of device 1700 can perform operations including receiving a derived encryption key from a remote management server without receiving a master key from which the derived encryption key was generated; and applying a one-way function to the derived encryption key and a nonce to generate a temporary encryption key.

In one or more embodiments, the secure device processor of device 1700 can perform operations including receiving the temporary encryption key from the secure element without receiving the derived encryption key; obtaining data for transmission to a recipient device; encrypting the data using the temporary encryption key to generate encrypted data; and providing the encrypted data over a network to the recipient device.

To enable these features, communication device 1700 can comprise a wireline and/or wireless transceiver 1702 (herein transceiver 1702), a user interface (UI) 1704, a power supply 1714, a location receiver 1716, a motion sensor 1718, an orientation sensor 1720, and a controller 1706 for managing operations thereof. The transceiver 1702 can support short-range or long-range wireless access technologies such as Bluetooth®, ZigBee®, WiFi, DECT, or cellular communication technologies, just to mention a few. Cellular technologies can include, for example, CDMA-1×, UMTS/HSDPA, GSM/GPRS, TDMA/EDGE, EV/DO, WiMAX, SDR, LTE, NFC, as well as other next generation wireless communication technologies as they arise. The transceiver 1702 can also be adapted to support circuit-switched wireline access technologies (such as PSTN), packet-switched wireline access technologies (such as TCP/IP, VoIP, and so forth), and combinations thereof.

The UI 1704 can include a depressible or touch-sensitive keypad 1708 with a navigation mechanism such as a roller ball, a joystick, a mouse, or a navigation disk for manipulating operations of the communication device 1700. The keypad 1708 can be an integral part of a housing assembly of the communication device 1700 or an independent device operably coupled thereto by a tethered wireline interface (such as a USB cable) or a wireless interface supporting for example Bluetooth®. The keypad 1708 can represent a numeric keypad commonly used by phones, and/or a QWERTY keypad with alphanumeric keys. The UI 1704 can further include a display 1710 such as monochrome or color LCD (Liquid Crystal Display), OLED (Organic Light Emitting Diode) or other suitable display technology for conveying images to an end user of the communication device 1700. In an embodiment where the display 1710 is touch-sensitive, a portion or all of the keypad 1708 can be presented by way of the display 1710 with navigation features.

The display 1710 can use touch screen technology to also serve as a user interface for detecting user input. As a touch screen display, the communication device 1700 can be adapted to present a user interface with graphical user interface (GUI) elements that can be selected by a user with a touch of a finger. The touch screen display 1710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1710 can be an integral part of the housing assembly of the communication device 1700 or an independent device communicatively coupled thereto by a tethered wireline interface (such as a cable) or a wireless interface.

The UI 1704 can also include an audio system 1712 that utilizes audio technology for conveying low volume audio (such as audio heard in proximity of a human ear) and high volume audio (such as speakerphone for hands free operation). The audio system 1712 can further include a microphone for receiving audible signals of an end user. The audio system 1712 can also be used for voice recognition applications. The UI 1704 can further include an image sensor 1713 such as a charged coupled device (CCD) camera for capturing still or moving images.

The power supply 1714 can utilize common power management technologies such as replaceable and rechargeable batteries, supply regulation technologies, and/or charging system technologies for supplying energy to the components of the communication device 1700 to facilitate long-range or short-range portable applications. Alternatively, or in combination, the charging system can utilize external power sources such as DC power supplied over a physical interface such as a USB port or other suitable tethering technologies.

The location receiver 1716 can utilize location technology such as a global positioning system (GPS) receiver capable of assisted GPS for identifying a location of the communication device 1700 based on signals generated by a constellation of GPS satellites, which can be used for facilitating location services such as navigation. The motion sensor 1718 can utilize motion sensing technology such as an accelerometer, a gyroscope, or other suitable motion sensing technology to detect motion of the communication device 1700 in three-dimensional space. The orientation sensor 1720 can utilize orientation sensing technology such as a magnetometer to detect the orientation of the communication device 1700 (north, south, west, and east, as well as combined orientations in degrees, minutes, or other suitable orientation metrics).

The communication device 1700 can use the transceiver 1702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1700.

Other components not shown in FIG. 17 can be used in one or more embodiments of the subject disclosure. For instance, the communication device 1700 can include a reset button (not shown). The reset button can be used to reset the controller 1706 of the communication device 1700. In yet another embodiment, the communication device 1700 can also include a factory default setting button positioned, for example, below a small hole in a housing assembly of the communication device 1700 to force the communication device 1700 to re-establish factory settings. In this embodiment, a user can use a protruding object such as a pen or paper clip tip to reach into the hole and depress the default setting button. In one embodiment, the communication device 1700 can also include a slot for adding or removing the UICC.

The communication device 1700 as described herein can operate with more or less of the circuit components shown in FIG. 17. These variant embodiments can be used in one or more embodiments of the subject disclosure.

The communication device 1700 can be adapted to perform the functions of the media processor 1606, the media devices 1608, the portable communication devices 1616 and/or the server 1630 of FIG. 16. It will be appreciated that the communication device 1700 can also represent other devices that can operate in communication system 1600 of FIG. 16, such as a gaming console and a media player.

The communication device 1700 shown in FIG. 17 or portions thereof can serve as a representation of one or more of the devices of FIGS. 1-14 and 16 including end user devices, removable memory devices, customer premises equipment, remote management servers, application servers, and so forth. In one or more embodiments, the recipient device can be servers operated by, or otherwise affiliated with, a third party entity that is different from and/or independent of the service provider operating the remote management server. In addition, the controller 1706 can perform the functions 1662 and/or 1666.

Upon reviewing the aforementioned embodiments, it would be evident to an artisan with ordinary skill in the art that said embodiments can be modified, reduced, or enhanced without departing from the scope of the claims described below.

For example, one or more of the keys can be one-time use keys which are deleted or otherwise rendered inoperable after being applied, such as for encryption, modification, decryption and/or un-modification.

In one embodiment, encryption can be applied based on elliptical curve cryptography, Advance Encryption Standard (AES), and so forth. Other encryption techniques can be utilized, including symmetrical and/or asymmetrical cryptographic methods.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 18:
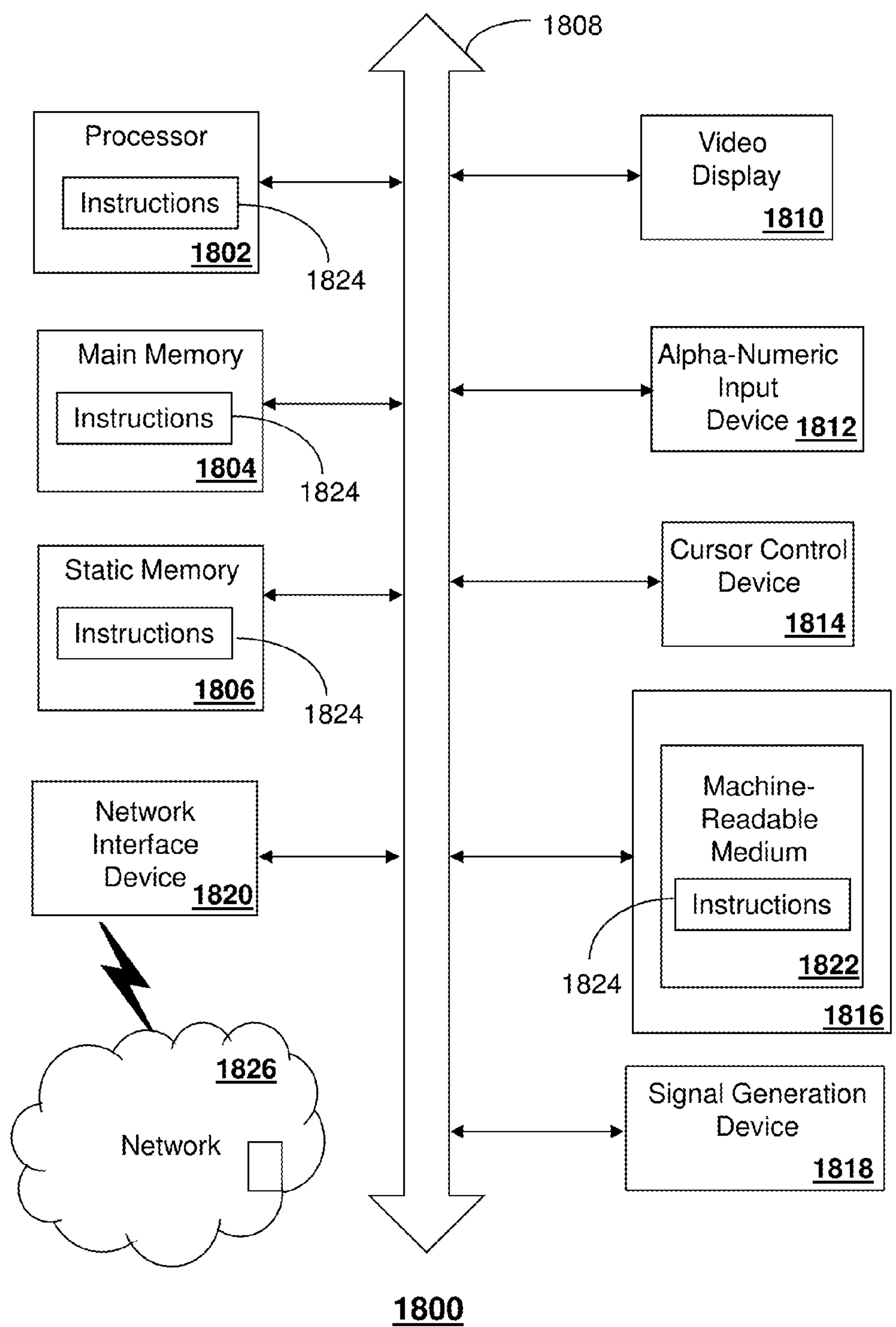
FIG. 18 is a diagrammatic representation of a machine in the form of a computer system within which a set of instructions, when executed, may cause the machine to perform any one or more of the methods described herein.

FIG. 18 depicts an exemplary diagrammatic representation of a machine in the form of a computer system 1800 within which a set of instructions, when executed, may cause the machine to perform any one or more of the methods described above. One or more instances of the machine can provide for secure upload or delivery of data from a mobile communication device to a recipient device utilizing various keysets, such as temporary encryption key. One or more instances of the machine can operate, for example, as the mobile communication device, the application server, the recipient device, the recipient end user device, the recipient removable memory device, the remote management server, the secure services platform (e.g., the secure element and/or the SDP), the device processor, and so forth. In some embodiments, the machine may be connected (e.g., using a network 1826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1800 may include a processor (or controller) 1802 (e.g., a central processing unit (CPU)), a graphics processing unit (GPU, or both), a main memory 1804 and a static memory 1806, which communicate with each other via a bus 1808. The computer system 1800 may further include a display unit 1810 (e.g., a liquid crystal display (LCD), a flat panel, or a solid state display). The computer system 1800 may include an input device 1812 (e.g., a keyboard), a cursor control device 1814 (e.g., a mouse), a disk drive unit 1816, a signal generation device 1818 (e.g., a speaker or remote control) and a network interface device 1820. In distributed environments, the embodiments described in the subject disclosure can be adapted to utilize multiple display units 1810 controlled by two or more computer systems 1800. In this configuration, presentations described by the subject disclosure may in part be shown in a first of the display units 1810, while the remaining portion is presented in a second of the display units 1810.

The disk drive unit 1816 may include a tangible computer-readable storage medium 1822 on which is stored one or more sets of instructions (e.g., software 1824) embodying any one or more of the methods or functions described herein, including those methods illustrated above. The instructions 1824 may also reside, completely or at least partially, within the main memory 1804, the static memory 1806, and/or within the processor 1802 during execution thereof by the computer system 1800. The main memory 1804 and the processor 1802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, and so forth) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "separate" can include a component or device that is logically and/or physically separate from another component or device, which can include components/devices that operate independently of each other while being in communication with each other. In one or more embodiments, devices can be separate in that they do not share any common component (although such separate devices can be in communication with each other such as via an electrode coupling). In one or more embodiments, devices can be separate in that they each have one or more components that are not shared between each other but have one or more components that may be shared with each other.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP, NFC) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®, NFC), and long-range communications (e.g., WiMAX, GSM, CDMA, LTE) can be used by computer system 1800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

obtaining, by a remote management server comprising a processing system including a processor, a master key;

obtaining, by the remote management server, derivation data associated with an end user device;

generating, by the remote management server, a derived encryption key by applying a first one-way function to the master key and the derivation data;

providing, by the remote management server over a network, the derived encryption key to a universal integrated circuit card of the end user device to enable the universal integrated circuit card to generate a temporary encryption key for encrypting data by applying a second one-way function to the derived encryption key and a nonce, wherein the derived encryption key is provided to the universal integrated circuit card of the end user device without being provided to a secure device processor of the end user device, wherein the providing of the derived encryption key to the universal integrated circuit card enables the universal integrated circuit card to provide the temporary encryption key to the secure device processor for the encrypting of the data without the secure device processor receiving the derived encryption key;

preventing the master key from being provided by the remote management server to the end user device;

preventing the universal integrated circuit card of the end user device from accessing the master key, wherein the universal integrated circuit card, the secure device processor and a device processor are components housed in the end user device and in communication with each other;

providing, by the remote management server over the network, a public nonce key to the universal integrated circuit card to enable the universal integrated circuit card to encrypt the nonce to generate, an encrypted nonce; and providing, by the remote management server over the network, a private nonce key to an application server to enable the application server to decrypt the encrypted nonce that is received by the application server from the end user device.

2. The method of claim 1 comprising:

providing, by the remote management server over the network, the derived encryption key to the application server to enable the application server to decrypt encrypted data using the derived encryption key and the nonce, wherein the encrypted data is received by the application server from the end user device.

3. The method of claim 1, wherein the nonce comprises a non-repeating data set that includes a time stamp.

4. The method of claim 1, wherein the generating of the derived encryption key utilizes an elliptic curve, and wherein a size of nonces generated by the universal integrated circuit card varies over time.

5. The method of claim 1, wherein the master key is not provided by the remote management server to the application server.

6. The method of claim 1, wherein the obtaining of the master key includes accessing the master key stored in a memory of the remote management server, and further comprising:

providing, by the remote management server over the network, a public temporary encryption key to the universal integrated circuit card of the end user device to enable the universal integrated circuit card to encrypt the temporary encryption key to generate an encrypted temporary encryption key; and providing, by the remote management server over the network, a private temporary encryption key to the application server to enable the application server to decrypt the encrypted temporary encryption key that is received by the application server from the end user device.

7. A communication device comprising:

a secure element having a secure element memory that stores first executable instructions that, when executed by the secure element, facilitate performance of first set of operations, comprising:

receiving a derived encryption key from a remote management server without receiving a master key from which the derived encryption key was generated, wherein the secure element is prevented from accessing the master key, wherein the derived encryption key is generated by applying a first one-way function to the master key and derivation data;

generating a temporary encryption key by applying a second one-way function to the derived encryption key and a nonce;

receiving a public nonce key from the remote management server; and encrypting the nonce using the public nonce key to generate an encrypted nonce;

a secure device processor having a secure device processor memory that stores second executable instructions that, when executed by the secure device processor, facilitate performance of second set of operations, comprising:

receiving the temporary encryption key from the secure element without receiving the derived encryption key;

obtaining data for transmission to a recipient device;

encrypting the data using the temporary encryption key to generate encrypted data;

providing the encrypted data over a network to the recipient device;

receiving the encrypted nonce from the secure element; and providing the encrypted nonce over the network to the recipient device to enable the recipient device to decrypt the encrypted nonce using a private nonce key received by the recipient device from the remote management server, wherein the secure element, the secure device processor and a device processor are separate components housed in the communication device and in communication with each other.

8. The communication device of claim 7, wherein the device processor comprises a plurality of processors operating in a distributed processing environment, and wherein the first set of operations further comprise:

generating a number; and generating the nonce from the number, wherein the nonce comprises a non-repeating data set that includes a time stamp.

9. The communication device of claim 7, wherein the first set of operations further comprise:

receiving a public temporary encryption key from the remote management server;

encrypting the temporary encryption key using the public temporary encryption key to generate an encrypted temporary encryption key; and wherein the second set of operations further comprise:

receiving the encrypted temporary encryption key from the secure element; and providing the encrypted temporary encryption key over the network to the recipient device to enable the recipient device to decrypt the encrypted temporary encryption key using a private temporary encryption key received by the recipient device from the remote management server.

10. The communication device of claim 7, wherein the second set of operations further comprise:

monitoring for a key rotation event;

providing a key rotation request to the secure element responsive to detecting the key rotation event; and wherein the first set of operations further comprise generating a second temporary encryption key responsive to the key rotation request.

11. The communication device of claim 10, wherein the temporary encryption key and the second temporary encryption key are generated by the secure element during a single communication session, and wherein the second temporary encryption key is generated from the derived encryption key and a second nonce.

12. The communication device of claim 7, wherein the second set of operations further comprise:

generating a number;

generating a time stamp;

providing the number and the time stamp to the secure element; and wherein the first set of operations further comprise:

generating the nonce from the number and the time stamp.

13. The communication device of claim 7, wherein the nonce is generated by the secure element according to information provided by the secure device processor, and wherein the derived encryption key received from the remote management server is a fixed length static key.

14. The communication device of claim 7, wherein the first set of operations further comprise:

receiving an encrypted second nonce from the recipient device;

decrypting the nonce using the private nonce key to generate a second nonce;

generating a second temporary encryption key from the derived encryption key and the second nonce; and wherein the second set of operations further comprise:

receiving encrypted second data from the recipient device;

receiving the second temporary encryption key from the secure element; and decrypting the encrypted second data using the second temporary encryption key.

15. A method comprising:

receiving, by a secure element of a communication device comprising a processing system, a derived encryption key from a remote management server without receiving a master key from which the derived encryption key was generated, wherein the secure element is prevented from accessing the master key, and wherein the derived encryption key is generated by applying a first one-way function to the master key and derivation data;

generating, by the secure element, a temporary encryption key by applying a second one-way function to the derived encryption key and a nonce;

obtaining, by a secure device processor of the communication device, data for transmission to a recipient device;

encrypting, by the secure device processor, the data using the temporary encryption key to generate encrypted data;

providing, by the communication device, the encrypted data over a network to the recipient device, receiving, by the communication device, a public nonce key from the remote management server;

encrypting, by the communication device, the nonce using the public nonce key to generate an encrypted nonce; and providing, by the communication device, the encrypted nonce over the network to the recipient device to enable the recipient device to decrypt the encrypted nonce using a private nonce key received by the recipient device from the remote management server, wherein the secure element, the secure device processor and a device processor are separate components housed in the communication device and in communication with each other.

16. The method of claim 15, comprising:

receiving, by the communication device, a public temporary encryption key from the remote management server;

encrypting, by the communication device, the temporary encryption key using the public temporary encryption key to generate an encrypted temporary encryption key; and providing, by the communication device, the encrypted temporary encryption key over the network to the recipient device to enable the recipient device to decrypt the encrypted temporary encryption key using a private temporary encryption key received by the recipient device from the remote management server.

17. The method of claim 15, comprising:

detecting a key rotation event; and generating a second temporary encryption key responsive to the detecting of the key rotation event.

* * * * *